US012573260B2

(12) United States Patent
Acres

(10) Patent No.: US 12,573,260 B2
(45) **Date of Patent: *Mar. 10, 2026**

(54) GENERATING A SCORE RELATED TO PLAY ON GAMING DEVICES

(71) Applicant: Acres Technology, Las Vegas, NV (US)

(72) Inventor: John F. Acres, Las Vegas, NV (US)

(73) Assignee: Acres Technology, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/335,384

(22) Filed: Jun. 1, 2021

(65) Prior Publication Data

US 2021/0287481 A1 Sep. 16, 2021

Related U.S. Application Data

(60) Continuation of application No. 16/866,804, filed on May 5, 2020, now Pat. No. 11,037,399, which is a continuation of application No. 16/154,899, filed on Oct. 9, 2018, now Pat. No. 10,657,763, which is a continuation of application No. 15/924,612, filed on (Continued)

(51) Int. Cl.
*G07F 17/32* (2006.01)

(52) U.S. Cl.
CPC ............ *G07F 17/323* (2013.01); *G07F 17/32* (2013.01); *G07F 17/3211* (2013.01); *G07F 17/3234* (2013.01); *G07F 17/3237* (2013.01); *G07F 17/3239* (2013.01); *G07F 17/3246* (2013.01); *G07F 17/3258* (2013.01); *G07F 17/3288* (2013.01); *G07F 17/322* (2013.01); *G07F 17/3241* (2013.01)

(58) Field of Classification Search
CPC ............... G07F 17/322; G07F 17/3237; G07F 17/3241; G07F 17/3258; G07F 17/3239
See application file for complete search history.

(56) References Cited

U.S. PATENT DOCUMENTS 2,669,389 A 2/1954 Mesi et al.
3,124,355 A 3/1964 Mentzer et al.
(Continued)

FOREIGN PATENT DOCUMENTS

CN 1910630 A 2/2007
CN 1914650 A 2/2007
(Continued)

OTHER PUBLICATIONS

Acres, John, The Future of Gaming, Where Will You be in 10 Years?, Slot Operations Management / Casino Enterprise Management, Jul. 2007, pp. 8-10, 12.
(Continued)

*Primary Examiner* — William H Mcculloch, Jr.
(74) *Attorney, Agent, or Firm* — Ballard Spahr LLP

(57) ABSTRACT

Embodiments of the present invention are directed to generating and displaying a score related to the results of wagering by a player on an electronic gaming machine. In one embodiment, a method for generating a score related to play on at least one electronic gaming device includes tracking the amount wagered on the gaming device, tracking the amount awarded by the gaming device, and generating a score related to the tracked amounts.

20 Claims, 9 Drawing Sheets

Related U.S. Application Data

Mar. 19, 2018, now Pat. No. 10,121,313, which is a continuation of application No. 15/496,719, filed on Apr. 25, 2017, now Pat. No. 9,947,175, which is a continuation of application No. 13/363,146, filed on Jan. 31, 2012, now Pat. No. 9,666,015, which is a division of application No. 12/104,249, filed on Apr. 16, 2008, now abandoned.

(56) References Cited

U.S. PATENT DOCUMENTS 3,124,674 A 3/1964 Edward et al.
3,684,290 A 8/1972 Wayne
3,727,213 A 4/1973 Kurtenbach
3,751,040 A 8/1973 Carey
4,240,635 A 12/1980 Brown
4,254,404 A 3/1981 White
4,433,844 A 2/1984 Hooker et al.
4,624,459 A 11/1986 Kaufman
4,657,256 A 4/1987 Okada
4,836,546 A 6/1989 DiRe et al.
4,887,813 A 12/1989 Chiles, III et al.
5,022,653 A 6/1991 Suttle et al.
5,024,439 A 6/1991 Okada
5,027,102 A 6/1991 Sweeny
5,031,914 A 7/1991 Rosenthal
5,078,405 A 1/1992 Jones et al.
5,152,529 A 10/1992 Okada
5,178,395 A 1/1993 Lovell
5,221,083 A 6/1993 Dote
5,265,880 A 11/1993 Maksymec
5,342,049 A 8/1994 Wichinsky et al.
5,364,104 A 11/1994 Jones et al.
5,377,973 A 1/1995 Jones et al.
5,380,008 A 1/1995 Mathis et al.
5,490,670 A 2/1996 Hobert
5,536,016 A 7/1996 Thompson
5,564,700 A 10/1996 Celona
5,584,485 A 12/1996 Jones et al.
5,586,766 A 12/1996 Forte et al.
5,655,961 A 8/1997 Acres et al.
5,674,128 A 10/1997 Holch et al.
5,695,402 A 12/1997 Stupak
5,697,844 A 12/1997 Kohorn
5,743,798 A 4/1998 Adams et al.
5,758,875 A 6/1998 Giacalone, Jr.
5,766,076 A 6/1998 Pease et al.
5,816,918 A 10/1998 Kelly et al.
5,830,064 A 11/1998 Bradish et al.
5,836,816 A 11/1998 Bruin et al.
5,836,817 A 11/1998 Acres et al.
5,851,147 A 12/1998 Stupak et al.
5,910,048 A 6/1999 Feinberg
5,913,726 A 6/1999 Jones et al.
5,934,998 A 8/1999 Forte et al.
5,941,770 A 8/1999 Miers et al.
5,960,406 A 9/1999 Rasansky et al.
5,984,779 A 11/1999 Bridgeman et al.
6,003,013 A 12/1999 Boushy et al.
6,012,983 A 1/2000 Walker et al.
6,024,642 A 2/2000 Stupak
6,030,109 A 2/2000 Lobsenz
6,032,955 A 3/2000 Luciano et al.
6,045,130 A 4/2000 Jones et al.
6,048,272 A 4/2000 Tsujita
6,059,659 A 5/2000 Busch et al.
6,077,163 A 6/2000 Walker et al.
6,086,477 A 7/2000 Walker et al.
6,106,395 A 8/2000 Begis
6,110,041 A 8/2000 Walker et al.
6,110,043 A 8/2000 Olsen
6,135,884 A 10/2000 Hedrick et al.
6,142,872 A 11/2000 Walker et al.
6,146,271 A 11/2000 Kadlic
6,146,273 A 11/2000 Olsen
6,165,071 A 12/2000 Weiss
6,168,521 B1 1/2001 Luciano et al.
6,183,362 B1 2/2001 Boushy
6,186,892 B1 2/2001 Frank et al.
6,186,893 B1 2/2001 Walker et al.
6,196,918 B1 3/2001 Miers et al.
6,210,276 B1 4/2001 Mullins
6,217,448 B1 4/2001 Olsen
6,224,482 B1 5/2001 Bennett
6,234,900 B1 5/2001 Cumbers
6,254,483 B1 7/2001 Acres
6,264,560 B1 7/2001 Goldberg et al.
6,270,409 B1 8/2001 Shuster
6,289,382 B1 9/2001 Bowman-Amuah
6,293,866 B1 9/2001 Walker et al.
6,293,868 B1 9/2001 Bernard
6,302,793 B1 10/2001 Fertitta, III et al.
6,315,662 B1 11/2001 Jorasch et al.
6,315,666 B1 11/2001 Mastera et al.
6,319,122 B1 11/2001 Packes et al.
6,319,125 B1 11/2001 Acres
6,336,859 B2 1/2002 Jones et al.
6,347,996 B1 2/2002 Gilmore et al.
6,364,314 B1 4/2002 Canterbury
6,368,216 B1 4/2002 Hedrick
6,371,852 B1 4/2002 Acres
6,375,567 B1 4/2002 Acres
6,425,823 B1 7/2002 Byrne
6,428,002 B1 8/2002 Baranauskas
6,443,456 B1 9/2002 Gajor
6,454,648 B1 9/2002 Kelly et al.
6,457,045 B1 9/2002 Hanson et al.
6,471,588 B2 10/2002 Sakamoto
6,485,367 B1 11/2002 Joshi
6,485,368 B2 11/2002 Jones et al.
6,520,856 B1 2/2003 Walker et al.
6,533,662 B2 3/2003 Soltys et al.
6,565,434 B1 5/2003 Acres
6,565,436 B1 5/2003 Baerlocher
6,569,013 B1 5/2003 Taylor
6,575,832 B1 6/2003 Manfredi et al.
6,592,457 B1 7/2003 Frohm et al.
6,599,186 B1 7/2003 Walker et al.
6,599,193 B2 7/2003 Baerlocher et al.
6,606,615 B1 8/2003 Jennings et al.
6,620,046 B2 9/2003 Rowe
6,634,922 B1 10/2003 Driscoll et al.
6,648,757 B1 11/2003 Slomiany et al.
6,652,378 B2 11/2003 Cannon et al.
6,656,047 B1 12/2003 Tarantino et al.
6,695,700 B2 2/2004 Walker et al.
6,697,165 B2 2/2004 Wakai et al.
6,702,670 B2 3/2004 Jasper et al.
6,709,331 B2 3/2004 Berman
6,712,693 B1 3/2004 Hettinger
6,712,695 B2 3/2004 Mothwurf et al.
6,722,985 B2 4/2004 Criss-Puszkiewicz et al.
6,749,510 B2 6/2004 Giobbi
6,751,657 B1 6/2004 Zothner
6,755,420 B2 6/2004 Colton
6,758,754 B1 7/2004 Lavanchy et al.
6,760,595 B2 7/2004 Inselberg
6,780,104 B2 8/2004 Fox
6,786,824 B2 9/2004 Cannon
6,800,026 B2 10/2004 Cannon
6,800,027 B2 10/2004 Giobbi et al.
6,802,778 B1 10/2004 Lemay et al.
6,811,482 B2 11/2004 Letvosky
6,811,486 B1 11/2004 Luciano, Jr.
6,860,808 B2 3/2005 Levitan
6,860,810 B2 3/2005 Cannon et al.
6,939,227 B2 9/2005 Jorasch et al.
6,944,509 B2 9/2005 Altmaier et al.
6,948,171 B2 9/2005 Dan et al.
6,965,868 B1 11/2005 Bednarek
6,973,665 B2 12/2005 Dudkiewicz et al.
RE38,982 E 2/2006 Forte et al.
6,997,380 B2 2/2006 Safaei et al.
6,998,806 B2 2/2006 Suzuki

(56) References Cited

U.S. PATENT DOCUMENTS 7,037,195 B2 5/2006 Schneider et al.
7,056,210 B2 6/2006 Bansemer et al.
7,069,232 B1 6/2006 Fox et al.
7,090,579 B2 8/2006 Tarantino
7,094,149 B2 8/2006 Walker et al.
7,094,150 B2 8/2006 Ungaro et al.
7,103,560 B1 9/2006 Fox et al.
7,112,138 B2 9/2006 Hedrick et al.
7,131,908 B2 11/2006 Baerlocher
7,144,322 B2 12/2006 Gomez et al.
7,169,052 B2 1/2007 Beaulieu et al.
7,175,521 B2 2/2007 McClintic
7,182,690 B2 2/2007 Giobbi et al.
7,184,965 B2 2/2007 Fox et al.
7,186,181 B2 3/2007 Rowe
7,192,346 B2 3/2007 Mathis
7,195,243 B2 3/2007 Kenny et al.
7,201,654 B1 4/2007 Jarvis et al.
7,251,805 B2 7/2007 Koo
7,300,351 B2 11/2007 Thomas
7,329,185 B2 2/2008 Conover et al.
7,338,372 B2 3/2008 Morrow et al.
7,361,089 B2 4/2008 Daly et al.
7,374,486 B2 5/2008 Baerlocher
7,410,422 B2 8/2008 Fine
7,416,186 B2 8/2008 Walker et al.
7,458,892 B2 12/2008 Walker et al.
7,594,851 B2 9/2009 Falconer
7,601,060 B2 10/2009 Baerlocher et al.
7,628,691 B2 12/2009 Luciano et al.
7,674,180 B2 3/2010 Graham et al.
7,717,788 B2 5/2010 Rowe
7,744,453 B2 6/2010 Pacey
7,762,886 B2 7/2010 Pfennighausen et al.
7,765,121 B2 7/2010 Pace et al.
7,775,876 B2 8/2010 Rowe
7,780,520 B2 8/2010 Baerlocher
7,780,529 B2 8/2010 Rowe et al.
7,811,167 B2 10/2010 Giobbi et al.
7,819,742 B2 10/2010 Chamberlain et al.
7,846,018 B2 12/2010 Baerlocher
7,874,911 B2 1/2011 Walker et al.
7,942,735 B2 5/2011 Meyer et al.
7,963,844 B2 6/2011 Walker et al.
8,052,517 B2 11/2011 Manfredi et al.
8,133,105 B2 3/2012 Walker et al.
8,210,927 B2 7/2012 Hedrick et al.
8,272,945 B2 9/2012 Kelly et al.
8,317,620 B2 11/2012 Kelly et al.
8,678,902 B2 3/2014 Kelly et al.
8,727,867 B2 5/2014 Kane et al.
8,764,552 B2 7/2014 Wolf et al.
9,666,015 B2 5/2017 Acres
9,947,175 B2 4/2018 Acres
10,121,313 B2 11/2018 Acres
10,657,763 B2 5/2020 Acres
11,037,399 B2 * 6/2021 Acres .................. G07F 17/3234
12,211,345 B2 * 1/2025 Acres ...................... G07F 17/34
2001/0004609 A1 6/2001 Walker et al.
2001/0024015 A1 9/2001 Hogan et al.
2001/0031659 A1 10/2001 Perrie et al.
2001/0046893 A1 11/2001 Giobbi et al.
2001/0048193 A1 12/2001 Yoseloff et al.
2002/0013173 A1 1/2002 Walker et al.
2002/0016202 A1 2/2002 Fertitta et al.
2002/0019253 A1 2/2002 Reitzen et al.
2002/0032052 A1 3/2002 Levitan
2002/0034981 A1 3/2002 Hisada
2002/0039923 A1 4/2002 Cannon et al.
2002/0043759 A1 4/2002 Vancura
2002/0055381 A1 5/2002 Tarantino
2002/0058545 A1 * 5/2002 Luciano .................... A63F 1/00
463/18
2002/0072405 A1 6/2002 Soltys et al.
2002/0086726 A1 7/2002 Ainsworth
2002/0094855 A1 7/2002 Berman
2002/0103018 A1 8/2002 Rommerdahl et al.
2002/0107072 A1 8/2002 Giobbi
2002/0123376 A1 9/2002 Walker et al.
2002/0132664 A1 9/2002 Miller et al.
2002/0142825 A1 10/2002 Lark et al.
2002/0143652 A1 10/2002 Beckett
2002/0147040 A1 10/2002 Walker et al.
2002/0147043 A1 10/2002 Shulman et al.
2002/0152120 A1 10/2002 Howington
2002/0167126 A1 11/2002 De Raedt et al.
2002/0177480 A1 11/2002 Rowe
2002/0177483 A1 11/2002 Cannon
2002/0187834 A1 12/2002 Rowe et al.
2002/0193162 A1 12/2002 Walker et al.
2003/0003989 A1 1/2003 Johnson
2003/0013512 A1 1/2003 Rowe
2003/0013516 A1 * 1/2003 Walker ................ G07F 17/3244
463/25
2003/0017865 A1 1/2003 Beaulieu et al.
2003/0032474 A1 2/2003 Kaminkow
2003/0036425 A1 2/2003 Kaminkow et al.
2003/0054878 A1 3/2003 Bonoy et al.
2003/0054881 A1 3/2003 Hedrick et al.
2003/0060276 A1 3/2003 Walker et al.
2003/0064769 A1 4/2003 Muir
2003/0064771 A1 4/2003 Morrow et al.
2003/0067116 A1 4/2003 Colton
2003/0078101 A1 4/2003 Schneider et al.
2003/0083943 A1 5/2003 Adams et al.
2003/0087685 A1 5/2003 Hogan et al.
2003/0092484 A1 5/2003 Schneider et al.
2003/0100360 A1 5/2003 Manfredi et al.
2003/0114217 A1 6/2003 Walker et al.
2003/0119575 A1 6/2003 Centuori et al.
2003/0135304 A1 7/2003 Sroub et al.
2003/0144048 A1 7/2003 Silva
2003/0178774 A1 9/2003 Marcilio
2003/0186733 A1 10/2003 Wolf et al.
2003/0187736 A1 10/2003 Teague et al.
2003/0190944 A1 10/2003 Manfredi et al.
2003/0195029 A1 10/2003 Frohm et al.
2003/0199295 A1 10/2003 Vancura
2003/0199312 A1 10/2003 Walker et al.
2003/0204474 A1 10/2003 Capek et al.
2003/0207711 A1 11/2003 Rowe
2003/0209853 A1 11/2003 Harris
2003/0211884 A1 11/2003 Gauselmann
2003/0216169 A1 11/2003 Walker et al.
2003/0220138 A1 11/2003 Walker et al.
2003/0220139 A1 11/2003 Peterson
2003/0220143 A1 11/2003 Shteyn et al.
2003/0228901 A1 12/2003 Walker et al.
2003/0232640 A1 12/2003 Walker et al.
2003/0234489 A1 12/2003 Okada
2003/0236110 A1 12/2003 Beaulieu et al.
2004/0009808 A1 1/2004 Gauselmann
2004/0038735 A1 2/2004 Stell et al.
2004/0038736 A1 2/2004 Bryant et al.
2004/0048650 A1 3/2004 Mierau et al.
2004/0053657 A1 3/2004 Fiden et al.
2004/0053662 A1 3/2004 Pacey
2004/0053681 A1 3/2004 Jordan et al.
2004/0063484 A1 4/2004 Dreaper et al.
2004/0072609 A1 4/2004 Ungaro et al.
2004/0087360 A1 5/2004 Chamberlain et al.
2004/0103013 A1 5/2004 Jameson
2004/0121833 A1 6/2004 Mezen et al.
2004/0133485 A1 7/2004 Schoonmaker et al.
2004/0142742 A1 7/2004 Schneider et al.
2004/0158536 A1 8/2004 Kowal et al.
2004/0166940 A1 8/2004 Rothschild
2004/0180722 A1 9/2004 Giobbi
2004/0198485 A1 10/2004 Loose et al.
2004/0203611 A1 10/2004 Laporta et al.
2004/0204213 A1 10/2004 Schugar et al.
2004/0204216 A1 10/2004 Schugar
2004/0204222 A1 10/2004 Roberts
2004/0214637 A1 10/2004 Nonaka

(56) References Cited

U.S. PATENT DOCUMENTS

2004/0219967 A1 11/2004 Giobbi et al.
2004/0224750 A1 11/2004 Al-Ziyoud
2004/0229671 A1 11/2004 Stronach et al.
2004/0229683 A1 11/2004 Mothwurf et al.
2004/0229700 A1 11/2004 Cannon et al.
2004/0235542 A1 11/2004 Stronach et al.
2004/0248642 A1 12/2004 Rothschild
2004/0254010 A1 12/2004 Fine
2004/0266517 A1 12/2004 Bleich et al.
2005/0014558 A1 1/2005 Estey
2005/0026674 A1 2/2005 Wolf et al.
2005/0043072 A1 2/2005 Nelson
2005/0043088 A1 2/2005 Nguyen et al.
2005/0043092 A1 2/2005 Gauselmann
2005/0043094 A1 2/2005 Nguyen et al.
2005/0049028 A1 3/2005 Gornez et al.
2005/0054438 A1 3/2005 Rothschild et al.
2005/0058545 A1 3/2005 Cardenas
2005/0059467 A1 3/2005 Saffari et al.
2005/0070356 A1 3/2005 Mothwurf et al.
2005/0075164 A1 4/2005 Krynicky
2005/0096121 A1 5/2005 Gilliland et al.
2005/0096124 A1 5/2005 Stronach
2005/0101375 A1 5/2005 Webb et al.
2005/0101379 A1 5/2005 Falconer
2005/0119052 A1 6/2005 Russell et al.
2005/0124411 A1 6/2005 Schneider et al.
2005/0124415 A1 6/2005 Centuori et al.
2005/0148380 A1 7/2005 Cannon et al.
2005/0148383 A1 7/2005 Mayeroff
2005/0153773 A1 7/2005 Nguyen et al.
2005/0164764 A1 7/2005 Ghaly
2005/0181856 A1 8/2005 Cannon et al.
2005/0181860 A1 8/2005 Nguyen et al.
2005/0181862 A1 8/2005 Ashter et al.
2005/0187014 A1 8/2005 Saffari et al.
2005/0208995 A1 9/2005 Marshall et al.
2005/0215311 A1 9/2005 Hornik et al.
2005/0215314 A1 9/2005 Schneider et al.
2005/0215316 A1 9/2005 Rowe et al.
2005/0233794 A1 10/2005 Cannon et al.
2005/0239541 A1 10/2005 Jorasch et al.
2005/0239545 A1 10/2005 Rowe
2005/0250574 A1 11/2005 Kane et al.
2005/0251440 A1 11/2005 Bednarek
2005/0255902 A1 11/2005 Lind
2005/0266905 A1 12/2005 Emori et al.
2006/0009284 A1 1/2006 Schwartz et al.
2006/0025205 A1 2/2006 Casey et al.
2006/0025207 A1 2/2006 Walker et al.
2006/0025210 A1 2/2006 Johnson
2006/0030400 A1 2/2006 Mathis
2006/0040723 A1 2/2006 Baerlocher et al.
2006/0040730 A1 2/2006 Walker et al.
2006/0046830 A1 3/2006 Webb
2006/0046835 A1 3/2006 Walker et al.
2006/0052160 A1 3/2006 Saffari et al.
2006/0058095 A1 3/2006 Berman et al.
2006/0058097 A1 3/2006 Berman et al.
2006/0068898 A1 3/2006 Maya
2006/0068899 A1 3/2006 White et al.
2006/0068903 A1 3/2006 Walker et al.
2006/0073872 A1 4/2006 B-Jensen et al.
2006/0073887 A1 4/2006 Nguyen et al.
2006/0079310 A1 4/2006 Friedman et al.
2006/0079314 A1 4/2006 Walker et al.
2006/0084496 A1 4/2006 Jaffe et al.
2006/0094493 A1 5/2006 Kido
2006/0100009 A1 5/2006 Walker et al.
2006/0105836 A1 5/2006 Walker et al.
2006/0116201 A1 6/2006 Gauselmann
2006/0121972 A1 6/2006 Walker et al.
2006/0121981 A1 6/2006 Pfennighausen et al.
2006/0128467 A1 6/2006 Thomas
2006/0135249 A1 6/2006 Seelig et al.
2006/0148559 A1 7/2006 Jordan et al.
2006/0149632 A1 7/2006 Register et al.
2006/0154714 A1 7/2006 Montross et al.
2006/0161620 A1 7/2006 Matthews et al.
2006/0174270 A1 8/2006 Westberg et al.
2006/0183530 A1 8/2006 Ellis
2006/0183536 A1 8/2006 Gagner et al.
2006/0199631 A1 9/2006 McGill et al.
2006/0205483 A1 9/2006 Meyer et al.
2006/0211486 A1 9/2006 Walker et al.
2006/0217175 A1 9/2006 Walker et al.
2006/0223613 A1 10/2006 Walker et al.
2006/0229127 A1 10/2006 Walker et al.
2006/0247034 A1 11/2006 Schneider et al.
2006/0247041 A1 11/2006 Walker et al.
2006/0252510 A1 11/2006 Walker et al.
2006/0252512 A1 11/2006 Walker et al.
2006/0252528 A1 11/2006 Walker et al.
2006/0258422 A1 11/2006 Walker et al.
2006/0258425 A1 11/2006 Edidin et al.
2006/0258432 A1 11/2006 Packer et al.
2006/0287034 A1 12/2006 Englman et al.
2006/0287045 A1 12/2006 Walker et al.
2006/0287098 A1 12/2006 Morrow et al.
2006/0287102 A1 12/2006 White et al.
2007/0001396 A1 1/2007 Walker et al.
2007/0010309 A1 1/2007 Giobbi et al.
2007/0010315 A1 1/2007 Hein
2007/0050256 A1 3/2007 Walker et al.
2007/0060252 A1 3/2007 Taylor
2007/0060274 A1 3/2007 Rowe et al.
2007/0060323 A1 3/2007 Isaac et al.
2007/0060387 A1 3/2007 Enzminger et al.
2007/0077988 A1 4/2007 Friedman
2007/0105615 A1 5/2007 Lind
2007/0105618 A1 5/2007 Steil
2007/0106553 A1 5/2007 Jordan et al.
2007/0111776 A1 5/2007 Griswold et al.
2007/0112609 A1 5/2007 Howard et al.
2007/0117619 A1 5/2007 Walker et al.
2007/0117623 A1 5/2007 Nelson et al.
2007/0129147 A1 6/2007 Gagner
2007/0135214 A1 6/2007 Walker et al.
2007/0143156 A1 6/2007 van Deursen
2007/0167210 A1 7/2007 Kelly et al.
2007/0184897 A1 8/2007 Fujimoto
2007/0191087 A1 8/2007 Thomas et al.
2007/0197247 A1 8/2007 Inselberg
2007/0205556 A1 9/2007 Roemer et al.
2007/0259709 A1 11/2007 Kelly et al.
2007/0275777 A1 11/2007 Walker et al.
2008/0015004 A1 1/2008 Gatto et al.
2008/0039190 A1 2/2008 Walker et al.
2008/0058105 A1 3/2008 Combs et al.
2008/0064495 A1 3/2008 Bryant et al.
2008/0076576 A1 3/2008 Graham et al.
2008/0090651 A1 4/2008 Baerlocher
2008/0096636 A1 4/2008 Power
2008/0102921 A1 5/2008 Urquhart
2008/0102935 A1 5/2008 Finnimore
2008/0113749 A1 5/2008 Williams et al.
2008/0113779 A1 5/2008 Cregan
2008/0113811 A1 5/2008 Lindard et al.
2008/0132320 A1 6/2008 Rodgers
2008/0146331 A1 6/2008 Nordman et al.
2008/0153564 A1 6/2008 Baerlocher et al.
2008/0171586 A1 7/2008 Roemer
2008/0176647 A1 7/2008 Acres
2008/0182655 A1 7/2008 DeWaal et al.
2008/0207313 A1 8/2008 Acres
2008/0220861 A1 9/2008 Okada
2008/0234035 A1 9/2008 Malek
2008/0242394 A1 10/2008 Sakuma
2008/0242398 A1 10/2008 Harris et al.
2008/0248851 A1 10/2008 Bloom
2008/0254886 A1 10/2008 Kelly
2008/0261699 A1 10/2008 Topham et al.
2008/0268959 A1 10/2008 Bryson et al.
2008/0280674 A1 11/2008 Sakuma

(56) References Cited

U.S. PATENT DOCUMENTS

2008/0287186 A1 11/2008 Sakuma
2008/0293467 A1 11/2008 Mathis
2008/0318656 A1 12/2008 Walker et al.
2009/0005170 A9 1/2009 Kelly et al.
2009/0036202 A1 2/2009 Baerlocher et al.
2009/0070081 A1 3/2009 Saenz et al.
2009/0075728 A1 3/2009 Acres
2009/0088239 A1 4/2009 Iddings et al.
2009/0117981 A1 5/2009 Yoshizawa
2009/0118005 A1 5/2009 Kelly et al.
2009/0124327 A1 5/2009 Caputo et al.
2009/0124364 A1 5/2009 Cuddy et al.
2009/0131175 A1 5/2009 Kelly et al.
2009/0170608 A1 7/2009 Herrmann et al.
2009/0176580 A1 7/2009 Herrmann et al.
2009/0233682 A1 9/2009 Kato et al.
2009/0239601 A1 9/2009 Macke
2009/0239622 A1 9/2009 Fujimori et al.
2009/0239628 A1 9/2009 Fujimori et al.
2009/0247284 A1 10/2009 Sugiyama et al.
2009/0253477 A1 10/2009 Teranishi
2009/0253478 A1 10/2009 Walker et al.
2009/0253490 A1 10/2009 Teranishi
2009/0264171 A1 10/2009 Acres
2009/0270168 A1 10/2009 Englman et al.
2009/0286590 A1 11/2009 Bennett
2009/0325669 A1 12/2009 Kelly et al.
2009/0325670 A1 12/2009 Kelly et al.
2010/0016055 A1 1/2010 Englman et al.
2010/0041464 A1 2/2010 Arezina et al.
2010/0048286 A1 2/2010 Okada et al.
2010/0056248 A1 3/2010 Acres
2010/0075741 A1 3/2010 Aoki et al.
2010/0105454 A1 4/2010 Weber et al.
2010/0105466 A1 4/2010 Inamura et al.
2010/0113130 A1 5/2010 Kamano et al.
2010/0124981 A1 5/2010 Kato et al.
2010/0160035 A1 6/2010 Herrmann
2010/0285867 A1 11/2010 Okada
2010/0304834 A1 12/2010 Okada
2011/0014964 A1 1/2011 Crowder, Jr. et al.
2011/0039615 A1 2/2011 Acres
2011/0081958 A1 4/2011 Herrmann et al.
2011/0165938 A1 7/2011 Anderson et al.
2011/0218030 A1 9/2011 Acres
2011/0263336 A1 10/2011 Rybak
2011/0275438 A9 11/2011 Hardy et al.
2011/0281632 A1 11/2011 Okada
2011/0287826 A1 11/2011 Kato et al.
2011/0294563 A1 12/2011 Jaffe
2012/0077565 A1 3/2012 Barbalet
2012/0108337 A1* 5/2012 Kelly .................. G07F 17/3211
463/37
2012/0115566 A1 5/2012 Fujisawa et al.
2012/0122558 A1* 5/2012 Lyons ................. A63F 11/0074
463/25
2012/0135800 A1 5/2012 Acres
2012/0190425 A1 7/2012 Barbalet
2014/0323199 A1 10/2014 DiMichele et al.
2015/0005059 A1 1/2015 Johnson
2015/0371504 A1 12/2015 Guinn et al.
2017/0193746 A1* 7/2017 Acres .................. G07F 17/3283
2017/0200349 A1* 7/2017 Englman ............. G07F 17/3211
2017/0228961 A1* 8/2017 Acres .................. G07F 17/3227
2017/0228962 A1 8/2017 Acres
2018/0068529 A1* 3/2018 Delekta ............... G07F 17/3258
2018/0211474 A1 7/2018 Acres
2019/0051095 A1 2/2019 Acres
2020/0265668 A1 8/2020 Acres
2021/0287481 A1* 9/2021 Acres .................. G07F 17/3258

FOREIGN PATENT DOCUMENTS

EP 0 141 264 A2 5/1985
EP 0 896 304 A2 2/1999
EP 0 896 308 A1 2/1999
EP 0 919 965 A2 6/1999
EP 0 981 397 A1 3/2000
EP 1 091 789 A1 4/2001
EP 1 231 577 A2 8/2002
EP 1 351 180 10/2003
EP 1 369 830 A1 12/2003
EP 1 490 849 A2 12/2004
EP 1 496 419 1/2005
EP 1 623 375 A1 2/2006
EP 1 637 196 A1 3/2006
EP 1 832 952 9/2007
JP 2-21883 1/1990
WO WO 95/21665 8/1995
WO WO 95/31262 11/1995
WO WO 96/35490 11/1996
WO WO 97/46293 12/1997
WO WO 00/17825 3/2000
WO WO 00/32286 6/2000
WO WO 00/64545 11/2000
WO WO 01/36059 A1 5/2001
WO WO 01/59680 8/2001
WO WO 01/80961 A1 11/2001
WO WO 03/066179 A2 8/2003
WO WO 03/089092 10/2003
WO 2005000629 1/2005
WO WO 2005/029279 A2 3/2005
WO WO 2005/029287 A2 3/2005
WO 2005073933 8/2005
WO WO 2005/099845 A1 10/2005
WO WO 2005/113093 A1 12/2005
WO WO 2006/014745 2/2006
WO WO 2006/014770 A2 2/2006
WO WO 2006/014990 A2 2/2006
WO WO 2006/032498 A1 3/2006
WO WO 2006/036948 A2 4/2006
WO WO 2006/055518 A2 5/2006
WO WO 2006/060442 6/2006
WO WO 2006/060493 6/2006
WO WO 2007/087286 8/2007
WO WO 2008/024705 A2 2/2008

OTHER PUBLICATIONS

Acres, John, Measuring the Player Experience: What a Squiggly Line Can Tell You, Inside Edge / Slot Manager, Jan./Feb. 2009, pp. 28-29.
Acres, John, An ingenious Internet Marketing Tool, Slot Operations Management / Casino Enterprise Management, Aug. 2007, pp. 8-10.
“White Paper: An Analysis of Harrah’s Total Rewards Players Rewards Program” written and published by Gaming Market Advisor on or before Dec. 31, 20006, retrieved from URL <http://www.gamingmarketadvisors.com/publications/Harrahs%20Total%20Rewards%20White%20Paper.pdf>, 41 pages.

* cited by examiner

GENERATING A SCORE RELATED TO PLAY ON GAMING DEVICES

RELATED APPLICATION

This application is a continuation of U.S. patent application Ser. No. 16/866,804, filed May 5, 2020, which is a continuation of U.S. patent application Ser. No. 16/154,899, filed Oct. 9, 2018, now U.S. Pat. No. 10,657,763, issued May 19, 2020, which is continuation of U.S. patent application Ser. No. 15/924,612, filed Mar. 19, 2018, now U.S. Pat. No. 10,121,313, issued Nov. 6, 2018, which is a continuation of U.S. patent application Ser. No. 15/496,719, filed Apr. 25, 2017, now U.S. Pat. No. 9,947,175, issued Apr. 17, 2018, which is a continuation of U.S. patent application Ser. No. 13/363,146 filed Jan. 31, 2012, now U.S. Pat. No. 9,666,015, issued May 30, 2017, which claims priority to and is a divisional application of U.S. patent application Ser. No. 12/104,249, filed Apr. 16, 2008, which are incorporated herein by reference.

FIELD OF THE INVENTION

This disclosure relates generally to generating a score related to play on electronic gaming machines, and more particularly to generating and displaying a score related to the results of wagering by a player on an electronic gaming machine.

BACKGROUND

Some prior art video arcade games incorporate systems that automatically store the highest scores on that game. Such games typically list the scores in order from the highest to the lowest, e.g., the top 5 scores. If at the conclusion of a game, the current game score is determined to be greater than one of the stored scores, the current score is inserted into the stored scores at the appropriate location and the lowest score drops off. In some cases, the player who makes it onto the top score list is given the opportunity to use the game controls to insert his or her initials next to their score. This generates excitement for the player who breaks into the ranks of top scorers and promotes friendly competition among players, all of which promotes game play.

With conventional gaming machines, a player typically only has a credit meter and a player tracking account that keeps track of his or her play on the gaming device. More specifically, the gaming device adjusts a credit meter to reflect the number of credits input by a player and adjusts that number relative to the number of credits wagered and/or won during game play of the gaming device. A player may also insert additional money during play of the gaming device, which raises the value displayed on the credit meter. Given these above scenarios, it becomes evident that the values displayed on the credit meters are not necessarily accurate indicators of the player's accomplishment on the gaming device. In addition, when the player has exhausted the credits on the credit meter or cashes out to retrieve the remaining credits on the credit meter, the credit meter remains at zero until that player or another player insert credits into the gaming machine. Hence, there is no indication as to how the previous player's gaming session went. In other words, the player may have won considerably more credits than he or she inputted into the gaming machine. However, there is no displayable record or other indication on the gaming machine of this gaming session.

Similarly, when a player inserts a player tracking card into a gaming device, the results of the gaming session may be stored on a player tracking server and player points accumulated during the gaming session may be displayed on the gaming machine or a peripheral device connected to the gaming machine. However, these displayed player points often only relate to the amount of credits wagered by the player (i.e., coin-in) and bear no relationship to the results achieved by a player during the course of the gaming session. In addition, once the player removes the player tracking card, no displayable record or other indication on the gaming machine exists for the gaming session.

Thus, in conventional gaming systems and devices, there is no means by which a player can display a particularly good gaming session to other players, nor a means by which other players can tell how previous players have done on a particular gaming machine.

DETAILED DESCRIPTION

Embodiments of the present invention are directed to generating and displaying a score related to the results of wagering by a player on a gaming device. In one embodiment, a method for generating a score related to play on at least one electronic gaming device includes tracking the amount wagered on the gaming device, tracking the amount awarded by the gaming device, and generating a score related to the tracked amounts.

Additional embodiments of the present invention may include methods in normalizing the generated scores, displaying the generated scores, and providing awards to a player based on the generated scores. These and other embodiments may form the basis for scoring systems that track, record, and/or display scores for a particular player, for a particular electronic gaming machine, or for a particular player on a particular gaming machine.

Figure 1A:
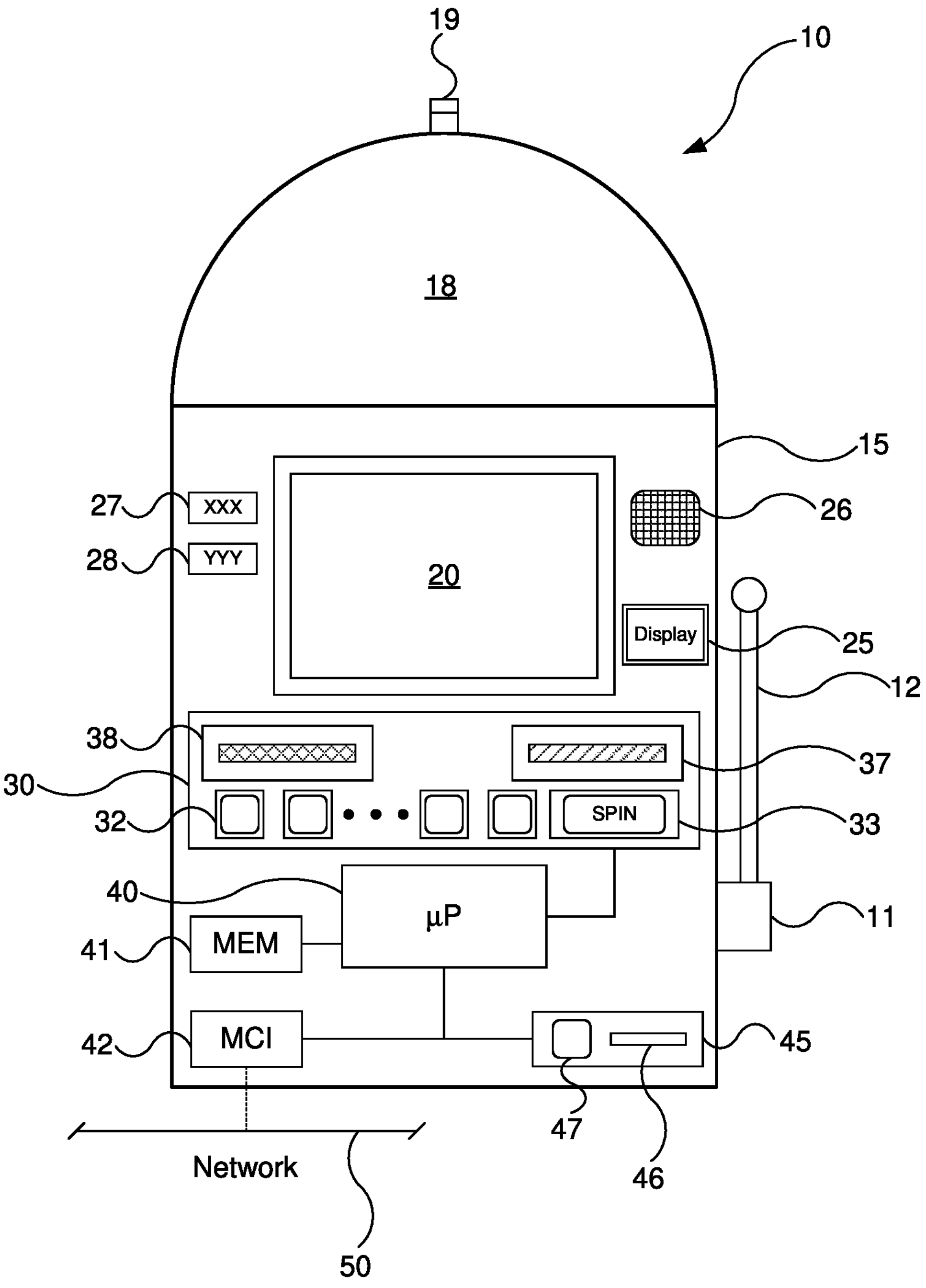
FIG. 1A is a functional block diagram that illustrates a gaming device according to embodiments of the invention.
Figure 1B:
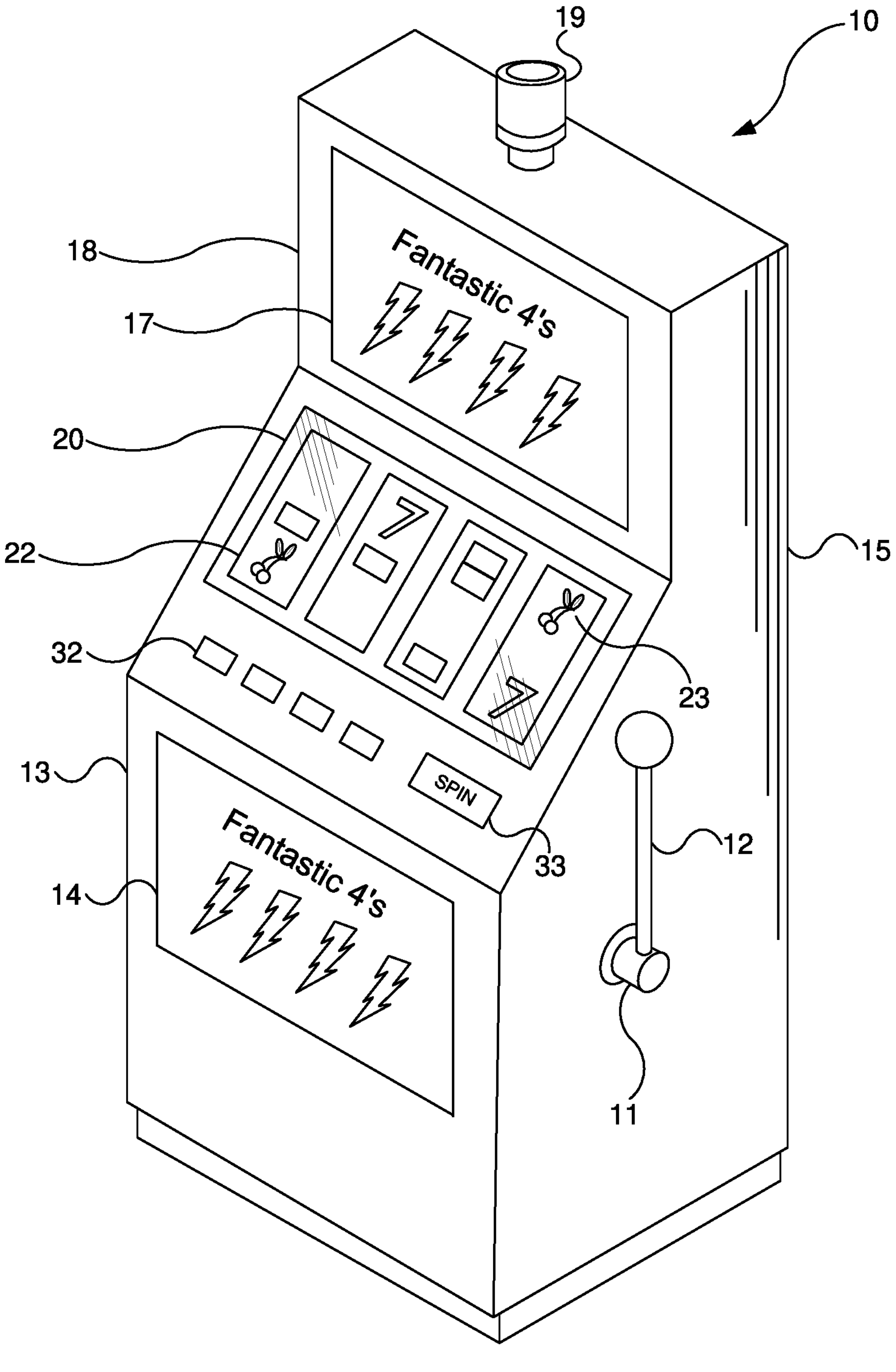
FIG. 1B is an isometric view of the gaming device illustrated in FIG. 1A.

FIGS. 1A and 1B illustrate example gaming devices according to embodiments of the invention.

Referring to FIGS. 1A and 1B, a gaming device 10 is an electronic gaming machine. Although an electronic gaming machine or "slot" machine is illustrated, various other types of devices may be used to wager monetarily based credits on a game of chance in accordance with principles of the invention. The term "electronic gaming device" is meant to include various devices such as electro-mechanical spinning-reel type slot machines, video slot machines, and video poker machines, for instance. Other gaming devices may include computer-based gaming machines, wireless gaming devices, multi-player gaming stations, modified personal electronic gaming devices (such as cell phones), personal computers, server-based gaming terminals, and other similar devices. Although embodiments of the invention will work with all of the gaming types mentioned, for ease of illustration the present embodiments will be described in reference to the electronic gaming machine 10 shown in FIGS. 1A and 1B.

The gaming device 10 includes a cabinet 15 housing components to operate the gaming device 10. The cabinet 15 may include a gaming display 20, a base portion 13, a top box 18, and a player interface panel 30. The gaming display 20 may include mechanical spinning reels (FIG. 2A), a video display (FIGS. 2B and 2C), or a combination of both spinning reels and a video display (not shown). The gaming cabinet 15 may also include a credit meter 27 and a coin-in or bet meter 28. The credit meter 27 may indicate the total number of credits remaining on the gaming device 10 that are eligible to be wagered. In some embodiments, the credit meter 27 may reflect a monetary unit, such as dollars. However, it is often preferable to have the credit meter 27 reflect a number of 'credits,' rather than a monetary unit. The bet meter 28 may indicate the amount of credits to be wagered on a particular game. Thus, for each game, the player transfers the amount that he or she wants to wager from the credit meter 27 to the bet meter 28. In some embodiments, various other meters may be present, such as meters reflecting amounts won, amounts paid, or the like. In embodiments where the gaming display 20 is a video monitor, the information indicated on the credit meters may be shown on the gaming display itself 20 (FIG. 2B).

The base portion 13 may include a lighted panel 14, a coin return (not shown), and a gaming handle 12 operable on a partially rotating pivot joint 11. The game handle 12 is traditionally included on mechanical spinning-reel games, where the handle may be pulled toward a player to initiate the spinning of reels 22 after placement of a wager. The top box 18 may include a lighted panel 17, a video display (such as an LCD monitor), a mechanical bonus device (not shown), and a candle light indicator 19. The player interface panel 30 may include various devices so that a player can interact with the gaming device 10.

The player interface panel 30 may include one or more game buttons 32 that can be actuated by the player to cause the gaming device 10 to perform a specific action. For example, some of the game buttons 32 may cause the gaming device 10 to bet a credit to be wagered during the next game, change the number of lines being played on a multi-line game, cash out the credits remaining on the gaming device (as indicated on the credit meter 27), or request assistance from casino personnel, such as by lighting the candle 19. In addition, the player interface panel 30 may include one or more game actuating buttons 33. The game actuating buttons 33 may initiate a game with a pre-specified amount of credits. On some gaming devices 10 a "Max Bet" game actuating button 33 may be included that places the maximum credit wager on a game and initiates the game. The player interface panel 30 may further include a bill acceptor 37 and a ticket printer 38. The bill acceptor 37 may accept and validate paper money or previously printed tickets with a credit balance. The ticket printer 38 may print out tickets reflecting the balance of the credits that remain on the gaming device 10 when a player cashes out by pressing one of the game buttons 32 programmed to cause a 'cash-out.' These tickets may be inserted into other gaming machines or redeemed at a cashier station or kiosk for cash.

The gaming device 10 may also include one or more speakers 26 to transmit auditory information or sounds to the player. The auditory information may include specific sounds associated with particular events that occur during game play on the gaming device 10. For example, a particularly festive sound may be played during a large win or when a bonus is triggered. The speakers 26 may also transmit "attract" sounds to entice nearby players when the game is not currently being played.

The gaming device 10 may further include a secondary display 25. This secondary display 25 may be a vacuum fluorescent display (VFD), a liquid crystal display (LCD), a cathode ray tube (CRT), a plasma screen, or the like. The secondary display 25 may show any combination of primary game information and ancillary information to the player. For example, the secondary display 25 may show player tracking information, secondary bonus information, advertisements, or player selectable game options.

The gaming device 10 may include a separate information window (not shown) dedicated to supplying any combination of information related to primary game play, secondary bonus information, player tracking information, secondary bonus information, advertisements or player selectable game options. This window may be fixed in size and location or may have its size and location vary temporally as communication needs change. One example of such a resizable window is International Game Technology's "service window". Another example is Las Vegas Gaming Incorporated's retrofit technology which allows information to be placed over areas of the game or secondary display screen at various times and in various situations.

The gaming device 10 includes a microprocessor 40 that controls operation of the gaming device 10. If the gaming device 10 is a standalone gaming device, the microprocessor 40 may control virtually all of the operations of the gaming devices and attached equipment, such as operating game logic stored in memory (not shown) as firmware, controlling the display 20 to represent the outcome of a game, communicate with the other peripheral devices (such as the bill acceptor 37), and orchestrating the lighting and sound emanating from the gaming device 10. In other embodiments where the gaming device 10 is coupled to a network 50, as described below, the microprocessor 40 may have different tasks depending on the setup and function of the gaming device. For example, the microprocessor 40 may be responsible for running the base game of the gaming device and executing instructions received over the network 50 from a bonus server or player tracking server. In a server-based gaming setup, the microprocessor 40 may act as a terminal to execute instructions from a remote server that is running game play on the gaming device.

The microprocessor 40 may be coupled to a machine communication interface (MCI) 42 that connects the gaming device 10 to a gaming network 50. The MCI 42 may be coupled to the microprocessor 40 through a serial connection, a parallel connection, an optical connection, or in some cases a wireless connection. The gaming device 10 may include memory 41 (MEM), such as a random access memory (RAM), coupled to the microprocessor 40 and which can be used to store gaming information, such as storing total coin-in statistics about a present or past gaming session, which can be communicated to a remote server or database through the MCI 42. The MCI 42 may also facilitate communication between the network 50 and the secondary display 25 or a player tracking unit 45 housed in the gaming cabinet 15.

The player tracking unit 45 may include an identification device 46 and one or more buttons 47 associated with the player tracking unit 45. The identification device 46 serves to identify a player, by, for example, reading a player-tracking device, such as a player tracking card that is issued by the casino to individual players who choose to have such a card. The identification device 46 may instead, or additionally, identify players through other methods. Player tracking systems using player tracking cards and card readers 46 are known in the art. Briefly summarizing such a system, a player registers with the casino prior to commencing gaming. The casino issues a unique player-tracking card to the player and opens a corresponding player account that is stored on a server or host computer, described below with reference to FIG. 3. The player account may include the player's name and mailing address and other information of interest to the casino in connection with marketing efforts. Prior to playing one of the gaming devices in the casino, the player inserts the player tracking card into the identification device 46 thus permitting the casino to track player activity, such as amounts wagered, credits won, and rate of play.

To induce the player to use the card and be an identified player, the casino may award each player points proportional to the money or credits wagered by the player. Players typically accrue points at a rate related to the amount wagered, although other factors may cause the casino to award the player various amounts. The points may be displayed on the secondary display 25 or using other methods. In conventional player tracking systems, the player may take his or her card to a special desk in the casino where a casino employee scans the card to determine how many accrued points are in the player's account. The player may redeem points for selected merchandise, meals in casino restaurants, or the like, which each have assigned point values. In some player tracking systems, the player may use the secondary display 25 to access their player tracking account, such as to check a total number of points, redeem points for various services, make changes to their account, or download promotional credits to the gaming device 10. In other embodiments, the identification device 46 may read other identifying cards (such as driver licenses, credit cards, etc.) to identify a player and match them to a corresponding player tracking account. Although FIG. 1A shows the player tracking unit 45 with a card reader as the identification device 46, other embodiments may include a player tracking unit 45 with a biometric scanner, PIN code acceptor, or other methods of identifying a player to pair the player with their player tracking account.

During typical play on a gaming device 10, a player plays a game by placing a wager and then initiating a gaming session. The player may initially insert monetary bills or previously printed tickets with a credit value into the bill acceptor 37. The player may also put coins into a coin acceptor (not shown) or a credit, debit or casino account card into a card reader/authorizer (not shown). One of skill in the art will readily see that this invention is useful with all gambling devices, regardless of the manner in which wager value-input is accomplished.

The credit meter 27 displays the numeric credit value of the money inserted dependent on the denomination of the gaming device 10. That is, if the gaming device 10 is a nickel slot machine and a $20 bill inserted into the bill acceptor 37, the credit meter will reflect 400 credits or one credit for each nickel of the inserted twenty dollars. For gaming devices 10 that support multiple denominations, the credit meter 27 will reflect the amount of credits relative to the denomination selected. Thus, in the above example, if a penny denomination is selected after the $20 is inserted the credit meter will change from 400 credits to 2000 credits.

A wager may be placed by pushing one or more of the game buttons 32, which may be reflected on the bet meter 28. That is, the player can generally depress a "bet one" button (one of the buttons on the player interface panel 30, such as 32), which transfers one credit from the credit meter 27 to the bet meter 28. Each time the button 32 is depressed an additional single credit transfers to the bet meter 28 up to a maximum bet that can be placed on a single play of the electronic gaming device 10. The gaming session may be initiated by pulling the gaming handle 12 or depressing the spin button 33. On some gaming devices 10, a "max bet" button (another one of the buttons 32 on the player interface panel 30) may be depressed to wager the maximum number of credits supported by the gaming device 10 and initiate a gaming session.

If the gaming session does not result in any winning combination, the process of placing a wager may be repeated by the player. Alternatively, the player may cash out any remaining credits on the credit meter 27 by depressing the "cash-out" button (another button 32 on the player interface panel 30), which causes the credits on the credit meter 27 to be paid out in the form of a ticket through the ticket printer 38, or may be paid out in the form of returning coins from a coin hopper (not shown) to a coin return tray.

If instead a winning combination (win) appears on the display 20, the award corresponding to the winning combination is immediately applied to the credit meter 27. For example, if the gaming device 10 is a slot machine, a winning combination of symbols 23 may land on a played payline on reels 22. If any bonus games are initiated, the gaming device 10 may enter into a bonus mode or simply award the player with a bonus amount of credits that are applied to the credit meter 27.

Figure 2A:
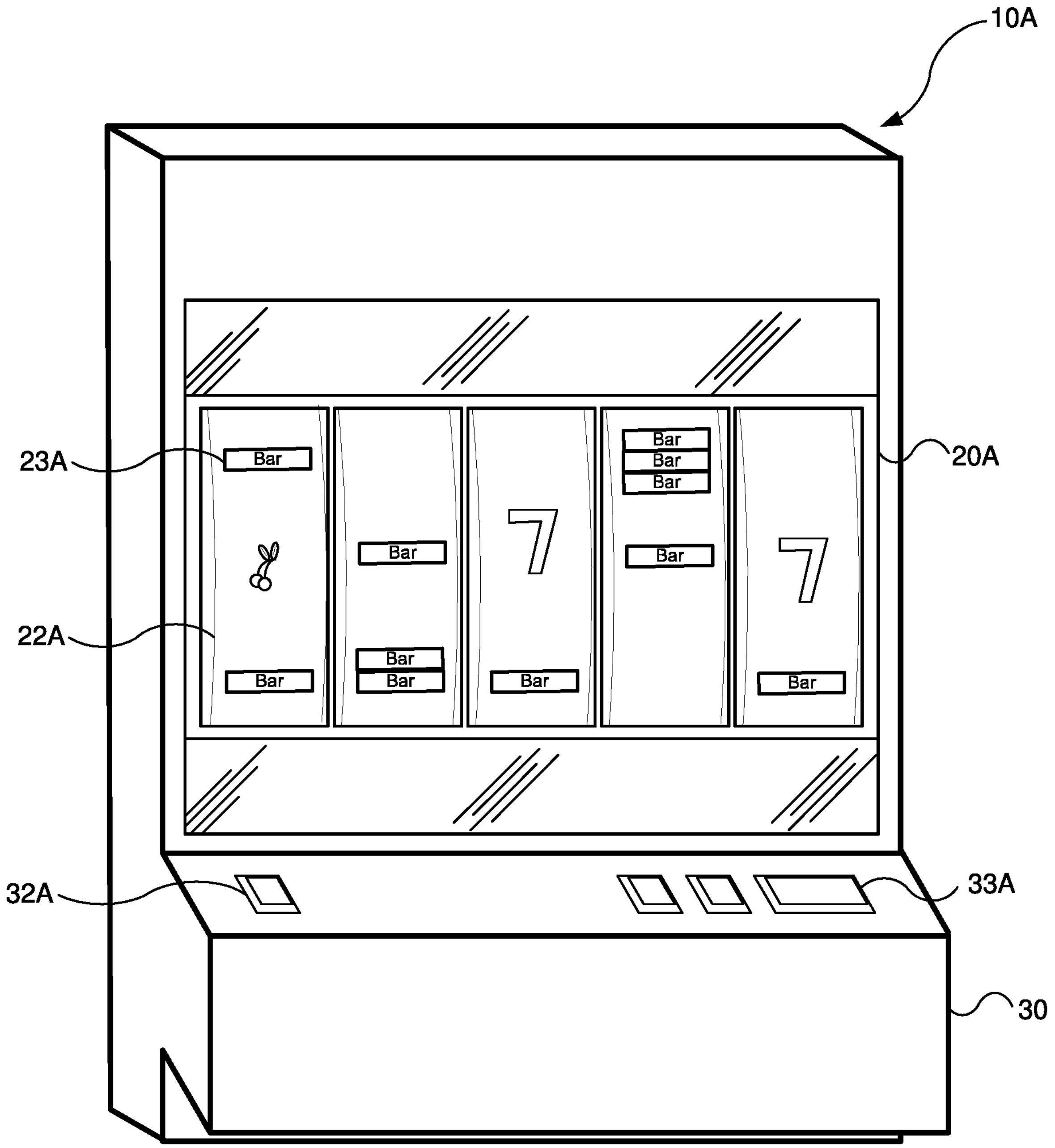
FIGS. 2A, 2B, and 2C are detail diagrams of exemplary types of gaming devices according to embodiments of the invention.
Figure 2B:
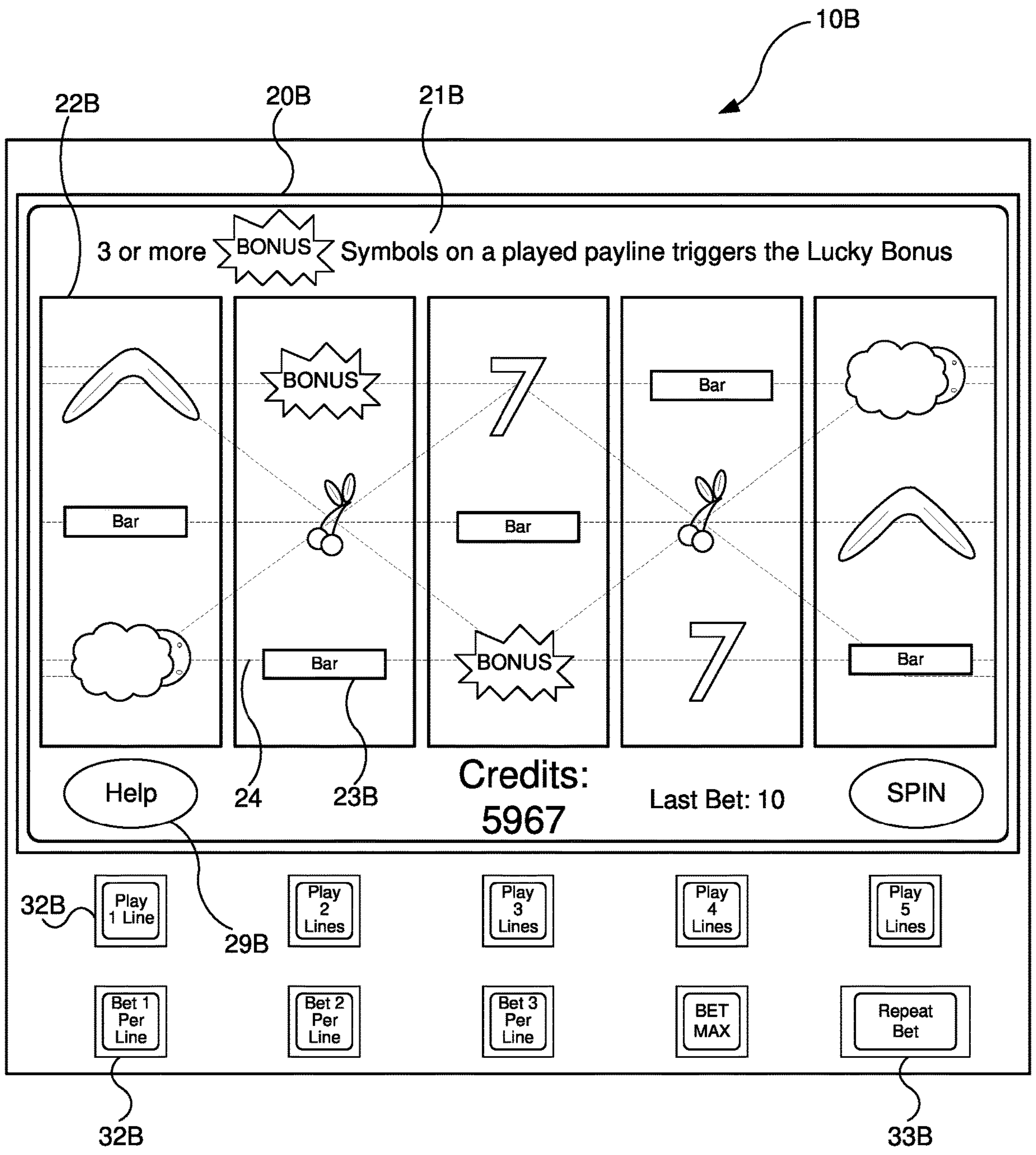
Figure 2C:
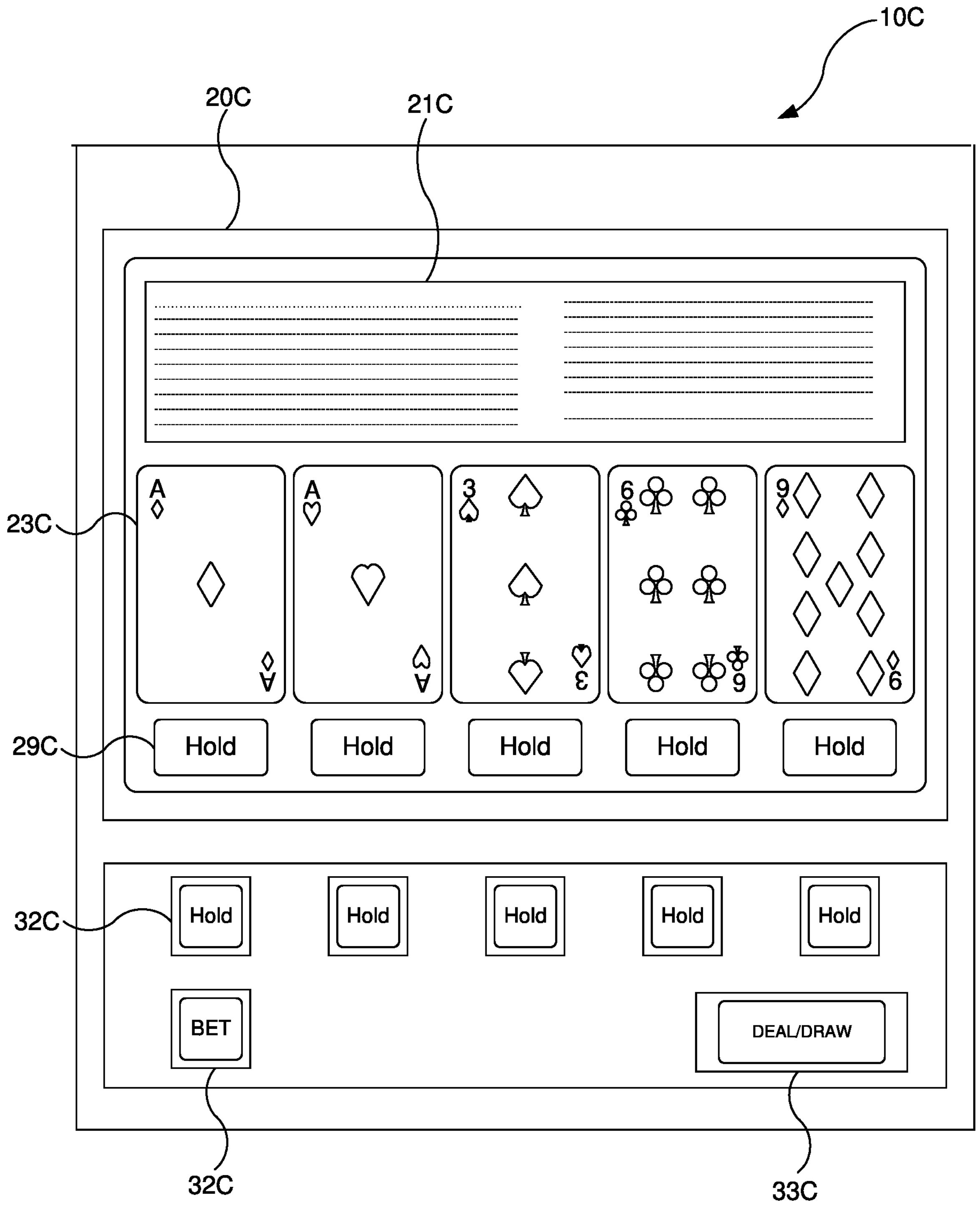

FIGS. 2A to 2C illustrate exemplary types of gaming devices according to embodiments of the invention. FIG. 2A illustrates an example spinning-reel gaming machine 10A, FIG. 2B illustrates an example video slot machine 10B, and FIG. 2C illustrates an example video poker machine 10C.

Referring to FIG. 2A, a spinning-reel gaming machine 10A includes a gaming display 20A having a plurality of mechanical spinning reels 22A. Typically, spinning-reel gaming machines 10A have three to five spinning reels 22A. Each of the spinning reels 22A has multiple symbols 23A that may be separated by blank areas on the spinning reels 22A, although the presence of blank areas typically depends on the number of reels 22A present in the gaming device 10A and the number of different symbols 23A that may appear on the spinning reels 22A. Each of the symbols 22A or blank areas makes up a "stop" on the spinning reel 22A where the reel 22A comes to rest after a spin. Although the spinning reels 22A of various games 10A may have various numbers of stops, many conventional spinning-reel gaming devices 10A have reels 22A with twenty two stops.

During game play, the spinning reels 22A may be controlled by stepper motors (not shown) under the direction of the microprocessor 40 (FIG. 1A). Thus, although the spinning-reel gaming device 10A has mechanical based spinning reels 22A, the movement of the reels themselves is electronically controlled to spin and stop. This electronic control is advantageous because it allows a virtual reel strip to be stored in the memory 41 of the gaming device 10A, where various "virtual stops" are mapped to each physical stop on the physical reel 22A. This mapping allows the gaming device 10A to establish greater awards and bonuses available to the player because of the increased number of possible combinations afforded by the virtual reel strips.

A gaming session on a spinning reel slot machine 10A typically includes the player pressing the "bet-one" button (one of the game buttons 32A) to wager a desired number of credits followed by pulling the gaming handle 12 (FIGS. 1A, 1B) or pressing the spin button 33A to spin the reels 22A. Alternatively, the player may simply press the "max-bet" button (another one of the game buttons 32A) to both wager the maximum number of credits permitted and initiate the spinning of the reels 22A. The spinning reels 22A may all stop at the same time or may individually stop one after another (typically from left to right) to build player anticipation. Because the display 20A usually cannot be physically modified, some spinning reel slot machines 10A include an electronic display screen in the top box 18 (FIG. 1B), a mechanical bonus mechanism in the top box 18, or a secondary display 25 (FIG. 1A) to execute a bonus.

Referring to FIG. 2B, a video gaming machine 10B may include a video display 20B to display virtual spinning reels 22B and various other gaming information 21B. The video display 20B may be a CRT, LCD, plasma screen, or the like. It is usually preferable that the video display 20B be a touchscreen to accept player input. A number of symbols 23A appear on each of the virtual spinning reels 22B. Although FIG. 2B shows five virtual spinning reels 22B, the flexibility of the video display 20B allows for various reel 22B and game configurations. For example, some video slot games 10B spin reels for each individual symbol position (or stop) that appears on the video display 20B. That is, each symbol position on the screen is independent of every other position during the gaming sessions. In these types of games, very large numbers of pay lines or multiple super scatter pays can be utilized since similar symbols could appear at every symbol position on the video display 20B. On the other hand, other video slot games 10B more closely resemble the mechanical spinning reel games where symbols that are vertically adjacent to each other are part of the same continuous virtual spinning reel 22B.

Because the virtual spinning reels 22B, by virtue of being computer implemented, can have almost any number of stops on a reel strip, it is much easier to have a greater variety of displayed outcomes as compared to spinning-reel slot machines 10A (FIG. 2A) that have a fixed number of physical stops on each spinning reel 22A.

With the possible increases in reel 22B numbers and configurations over the mechanical gaming device 10A, video gaming devices 10B often have multiple paylines 24 that may be played. By having more paylines 24 available to play, the player may be more likely to have a winning combination when the reels 22B stop and the gaming session ends. However, since the player typically must wager at least a minimum number of credits to enable each payline 24 to be eligible for winning, the overall odds of winning are not much different, if at all, than if the player is wagering only on a single payline. For example, in a five line game, the player may bet one credit per payline 24 and be eligible for winning symbol combinations that appear on any of the five played paylines 24. This gives a total of five credits wagered and five possible winning paylines 24. If, on the other hand, the player only wagers one credit on one payline 24, but plays five gaming sessions, the odds of winning would be identical as above: five credits wagered and five possible winning paylines 24.

Because the video display 20B can easily modify the image output by the video display 20B, bonuses, such as second screen bonuses are relatively easy to award on the video slot game 10B. That is, if a bonus is triggered during game play, the video display 20B may simply store the resulting screen shot in memory and display a bonus sequence on the video display 20B. After the bonus sequence is completed, the video display 20B may then retrieve the previous screen shot and information from memory, and re-display that image.

Also, as mentioned above, the video display 20B may allow various other game information 21B to be displayed. For example, as shown in FIG. 2B, banner information may be displayed above the spinning reels 22B to inform the player, perhaps, which symbol combination is needed to trigger a bonus. Also, instead of providing a separate credit meter 27 (FIG. 1A) and bet meter 28, the same information can instead be displayed on the video display 20B. In addition, "soft buttons" 29B such as a "spin" button or "help/see pays" button may be built using the touch screen video display 20B. Such customization and ease of changing the image shown on the display 20B adds to the flexibility of the game 10B.

Even with the improved flexibility afforded by the video display 20B, several physical buttons 32B and 33B are usually provided on video slot machines 10B. These buttons may include game buttons 32B that allow a player to choose the number of paylines 24 he or she would like to play and the number of credits wagered on each payline 24. In addition, a max bet button (one of the game buttons 32B) allows a player to place a maximum credit wager on the maximum number of available paylines 24 and initiate a gaming session. A repeat bet or spin button 33B may also be used to initiate each gaming session when the max bet button is not used.

Referring to FIG. 2C, a video poker gaming device 10C may include a video display 20C that is physically similar to the video display 20B shown in FIG. 2B. The video display 20C may show a poker hand of five cards 23C and various other player information 21C including a paytable for various winning hands, as well as a plurality of player selectable soft buttons 29C. The video display 20C may present a poker hand of five cards 23C and various other player information 21C including a number of player selectable soft (touchscreen) buttons 29C and a paytable for various winning hands. Although the embodiment illustrated in FIG. 3C shows only one hand of poker on the video display 20C, various other video poker machines 10C may show several poker hands (multi-hand poker). Typically, video poker machines 10C play "draw" poker in which a player is dealt a hand of five cards, has the opportunity to hold any combination of those five cards, and then draws new cards to replace the discarded ones. All pays are usually given for winning combinations resulting from the final hand, although some video poker games 10C may give bonus credits for certain combinations received on the first hand before the draw. In the example shown in FIG. 2C a player has been dealt two aces, a three, a six, and a nine. The video poker game 10C may provide a bonus or payout for the player having been dealt the pair of aces, even before the player decides what to discard in the draw. Since pairs, three of a kind, etc. are typically needed for wins, a player would likely hold the two aces that have been dealt and draw three cards to replace the three, six, and nine in the hope of receiving additional aces or other cards leading to a winning combination with a higher award amount. After the draw and revealing of the final hand, the video poker game 10C typically awards any credits won to the credit meter.

The player selectable soft buttons 29C appearing on the screen respectively correspond to each card on the video display 20C. These soft buttons 29C allow players to select specific cards on the video display 20C such that the card corresponding to the selected soft button is "held" before the draw. Typically, video poker machines 10C also include physical game buttons 32C that correspond to the cards in the hand and may be selected to hold a corresponding card. A deal/draw button 33C may also be included to initiate a gaming session after credits have been wagered (with a bet button 32C, for example) and to draw any cards not held after the first hand is displayed.

Although examples of a spinning reel slot machine 10A, a video slot machine 10B, and a video poker machine 10C have been illustrated in FIGS. 2A-2C, gaming machines various other types of gaming devices known in the art are contemplated and are within the scope of the invention.

Figure 3:
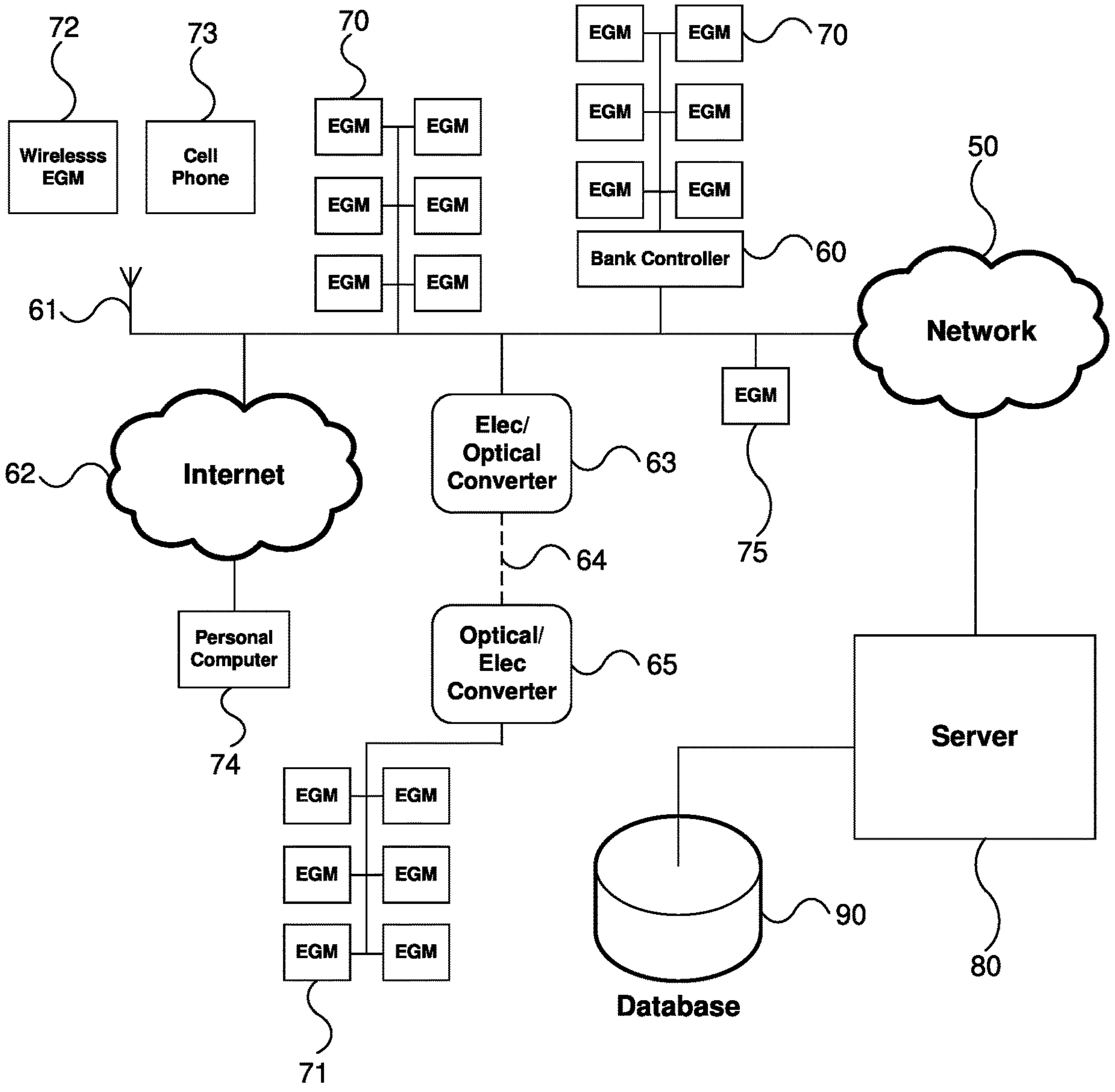
FIG. 3 is a functional block diagram of networked gaming devices according to embodiments of the invention.

FIG. 3 is a block diagram illustrating networked gaming devices according to embodiments of the invention. Referring to FIG. 3, multiple electronic gaming devices (EGMs) 70, 71, 72, 73, 74, and 75 may be coupled to one another and coupled to a remote server 80 through a network 50. For ease of understanding, gaming devices or EGMs 70, 71, 72, 73, 74, and 75 are generically referred to as EGMs 70-75. The term EGMs 70-75, however, may refer to any combination of one or more of EGMs 70, 71, 72, 73, 74, and 75. Additionally, the gaming server 80 may be coupled to one or more gaming databases 90. These gaming network 50 connections may allow multiple gaming devices 70-75 to remain in communication with one another during particular gaming modes such as tournament play or remote head-to-head play. Although some of the gaming devices 70-75 coupled on the gaming network 50 may resemble the gaming devices 10, 10A, 10B, and 10C shown in FIGS. 1A-1B and 2A-2C, other coupled gaming devices 70-75 may include differently configured gaming devices. For example, the gaming devices 70-75 may include traditional slot machines 75 directly coupled to the network 50, banks of gaming devices 70 coupled to the network 50, banks of gaming devices 70 coupled to the network through a bank controller 60, wireless handheld gaming machines 72 and cell phones 73 coupled to the gaming network 50 through one or more wireless routers or antennas 61, personal computers 74 coupled to the network 50 through the internet 62, and banks of gaming devices 71 coupled to the network through one or more optical connection lines 64. Additionally, some of the traditional gaming devices 70, 71, and 75 may include electronic gaming tables, multi-station gaming devices, or electronic components operating in conjunction with non-gaming components, such as automatic card readers, chip readers, and chip counters, for example.

Gaming devices 71 coupled over an optical line 64 may be remote gaming devices in a different location or casino. The optical line 64 may be coupled to the gaming network 50 through an electronic to optical signal converter 63 and may be coupled to the gaming devices 71 through an optical to electronic signal converter 65. The banks of gaming devices 70 coupled to the network 50 may be coupled through a bank controller 60 for compatibility purposes, for local organization and control, or for signal buffering purposes. The network 50 may include serial or parallel signal transmission lines and carry data in accordance with data transfer protocols such as Ethernet transmission lines, Rs-232 lines, firewire lines, USB lines, or other communication protocols. Although not shown in FIG. 3, substantially the entire network 50 may be made of fiber optic lines or may be a wireless network utilizing a wireless protocol such as IEEE 802.11 a, b, g, or n, Zigbee, RF protocols, optical transmission, near-field transmission, or the like.

As mentioned above, each gaming device 70-75 may have an individual processor 40 (FIG. 1A) and memory 41 to run and control game play on the gaming device 70-75, or some of the gaming devices 70-75 may be terminals that are run by a remote server 80 in a server based gaming environment. Server based gaming environments may be advantageous to casinos by allowing fast downloading of particular game types or themes based on casino preference or player selection. Additionally, tournament based games, linked games, and certain game types, such as BINGO or keno may benefit from at least some server 80 based control.

Thus, in some embodiments, the network 50, server 80, and database 90 may be dedicated to communications regarding specific game or tournament play. In other embodiments, however, the network 50, server 80, and database 90 may be part of a player tracking network. For player tracking capabilities, when a player inserts a player tracking card in the card reader 46 (FIG. 1A), the player tracking unit 45 sends player identification information obtained on the card reader 46 through the MCI 42 over the network 50 to the player tracking server 80, where the player identification information is compared to player information records on in the player database 90 to provide the player with information regarding their player accounts or other features at the gaming device 10 where the player is wagering. Additionally, multiple databases 90 and/or servers 80 may be present and coupled to one or more networks 50 to provide a variety of gaming services, such as both game/tournament data and player tracking data.

The various systems described with reference to FIGS. 1-3 can be used in a number of ways. For instance, the systems can be used to track data about various players. The tracked data can be used by the casino to provide additional benefits to players, such as extra bonuses or extra benefits such as bonus games and other benefits as described above. These added benefits further entice the players to play at the casino that provides the benefits.

Figure 4:
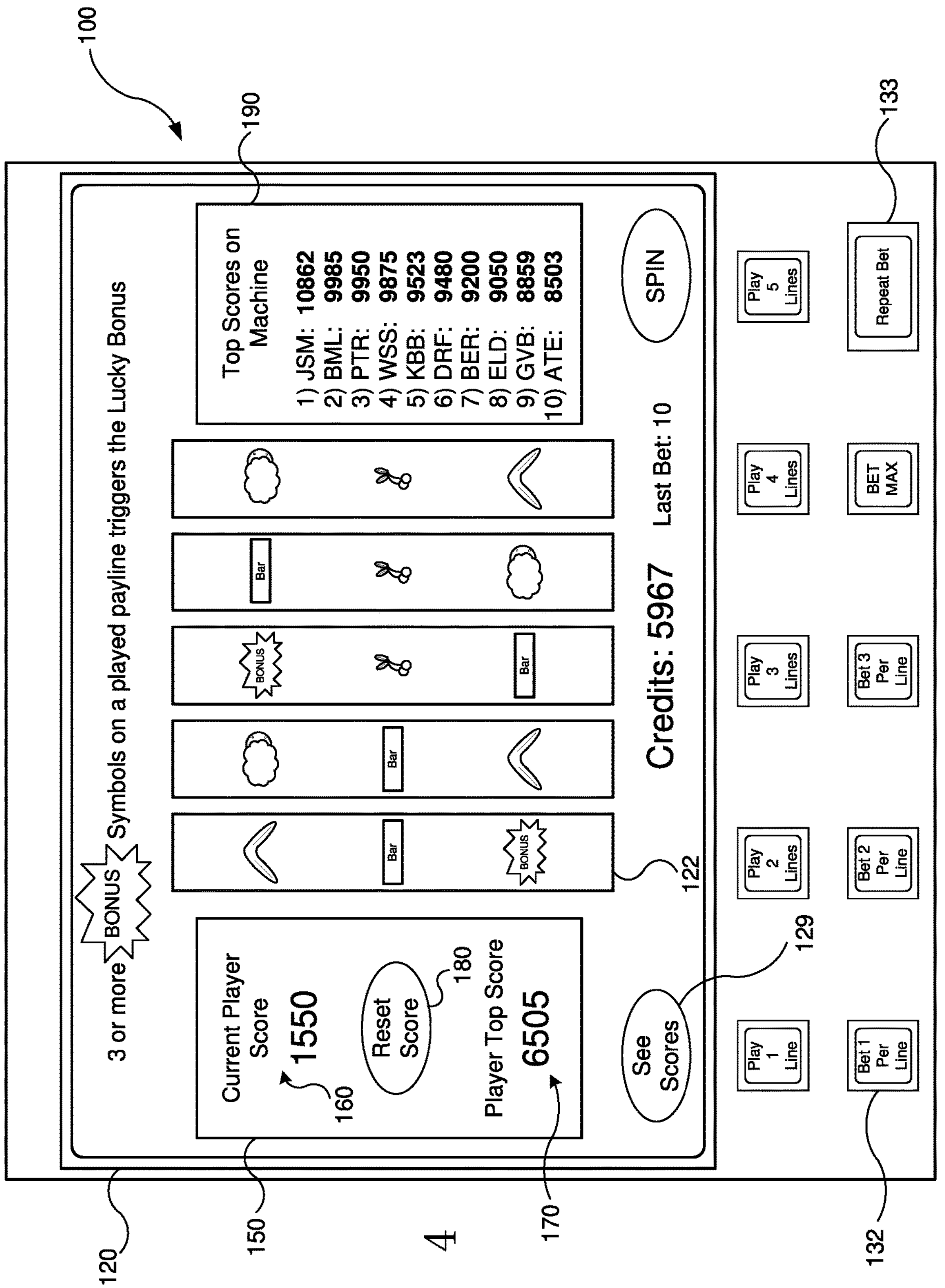
FIG. 4 is a detail diagram of a gaming device according to embodiments of the invention.

FIG. 4 is a detail diagram of a gaming device according to embodiments of the invention.

As discussed above, embodiments of the invention are directed to generating and displaying a score related to the results of wagering by a player on a gaming device. Referring to FIG. 4, a gaming device 100 includes a display 120 and a player interface panel having game buttons 132 and a game actuating button 133. The display 120 may include a game portion 122 that displays virtual spinning reels (e.g., for a video slot machine), card (e.g., for a video poker machine), or other indicia related to wagering on the gaming device 100. The display 120 may also include a player score portion 150 for displaying information relating to score information accumulated by a player at the gaming device 100. The player score portion 150 of the display may include a current player score or a running score information 160 relating to a score earned by a player during a scoring session. The player score portion 150 may also include a player top score 170. The display 120 may further include a device score portion 190 for displaying information relating to previous scores received on the gaming device 100. Although the gaming device 100 illustrated in FIG. 4 includes a player score portion 150 displaying a current player score 160 and a player top score 170, as well as a device score portion 190, various embodiments of the invention may only display some of this scoring information, or may display portions of this scoring information at different times. For example, the device score portion 190 may be shown when a player is not playing the gaming device 100 (e.g., on an attract screen), while the current player score 160 may be shown during game play so that a player can see their score increase with game play outcomes.

The player score portion 150 may include a current player score 160, a player top score 170, and a score reset button 180. The current player score 160 may reflect a player's current score accumulated during a scoring session (discussed in further detail below). The player top score 170 may reflect a player's top gaming session score during current game play on a particular gaming device, a player's top score on a particular gaming device 100, a player's top score on a type of gaming device (this may be a broad categorization, such as video poker, or this may be a relatively specific categorization, such as on Wheel of Fortune® games), or a player's top recorded score at a gaming establishment or family of gaming establishments. The score may be limited to a single playing session or span multiple playing sessions over a defined period of time. The player top score 170 may be associated with a player tracking account stored on a database 90 (FIG. 3). That is, a player top score 170 may be displayed on the gaming device 100 when the player identifies himself or herself to the gaming device 100, such as by inserting a player tracking card into a player tracking unit 45 (FIG. 1A).

The score reset button 180 may be a soft button (as shown in FIG. 4) or may be a physical game button 132. The score reset button 180 may allow a player to reset the current player score 160 during a scoring session to initiate another scoring session. This may be preferably done by a player when, for example, the player has a streak of losing game outcomes at the beginning of a scoring session and wants subsequent game outcomes, which may be wins, to count in a subsequent scoring session. In other embodiments, the score reset button 180 may be omitted so that players cannot reset the current player score 160 during a scoring session. By omitting the score reset button 180, each scoring session may be more fairly compared to other scoring sessions since a player would not be able to continually reset the current player score 160 until they began a scoring session with a streak of winning game outcomes.

The device score portion 190 may include a list of top scores earned on a particular gaming device, on a type of gaming device, or at a gaming establishment or family of gaming establishments. For example, the top scores may consist of all play on a particular machine or all play on a category of machines. For example, if a casino has 10 machines of identical nature, each game may show the top scores achieved in a given period on any of the gaming machines. If a player on machine number 1 achieved a top score of 521, and a player on machine 2 achieved a top score of 488, and no one on the other 8 machines had a score exceeding either, the top score on all 10 machines could be shown as 521 and the second highest as 488.

Although the embodiment illustrated in FIG. 4 shows a gaming device 100 having score information 160, 170, and/or 190 shown on a display 120, other embodiments may show score information in different manners. For example, score information may be displayed on a secondary display 25 (FIG. 1A), on a top box 18 display (FIG. 1B), on a meter similar to meters 27, 28 (FIG. 1A), on a scrolling banner (not shown), or on another similar display device associated with the gaming device 100. These alternate display examples may be preferable for mechanical spinning reel games that do include a main video display or on gaming devices where gaming information on a display is not preferably altered during gaming sessions, such as on video poker machines.

Further, although the embodiment illustrated in FIG. 4 shows the score information 160, 170, and/or 190 shown on the display 120 at the same time as displaying the game portion 122 that shows wagering outcomes, other embodiments may show this information in different manners or at different times. For example, the game portion 122 may be displayed across a majority of the display 120 as shown in FIG. 2B, for example, without displaying the scoring information. The gaming device 100 may periodically show at least some score information (especially the current player score 160) after one or more gaming sessions have been completed. This embodiment allows players to receive periodic updates of their current score 160 automatically. Alternatively, the player may view scoring information after any gaming session has been completed by pressing a soft button 129 on the game display 120 or pressing a physical game button 132 on the player interface. This embodiment, allows players to choose when they would like to review scoring information without slowing game play.

In either of these types of embodiments, scoring information may be shown in a second screen manner similar to a 'See Pays' or 'Help' screen. The scoring information may also be shown be reducing the size of a game portion 122 and displaying the score portions 150, 190, such as by reducing the game portion 122 from a size similar to that shown on FIG. 2B to that shown in FIG. 4. This display method may allow a player to quickly hit the game initiation button 133 to hide the score portions 150, 190, resize the game portion 122, and initiate a gaming session.

Figure 5A:
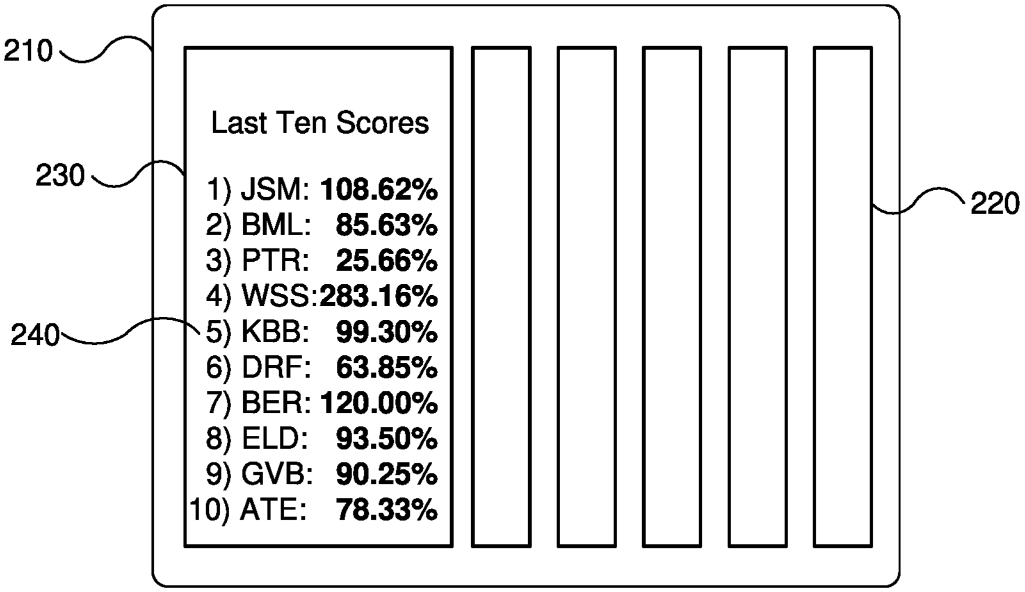
FIGS. 5A and 5B are detail diagrams of exemplary scoring displays on a gaming device according to embodiments of the invention.
Figure 5B:
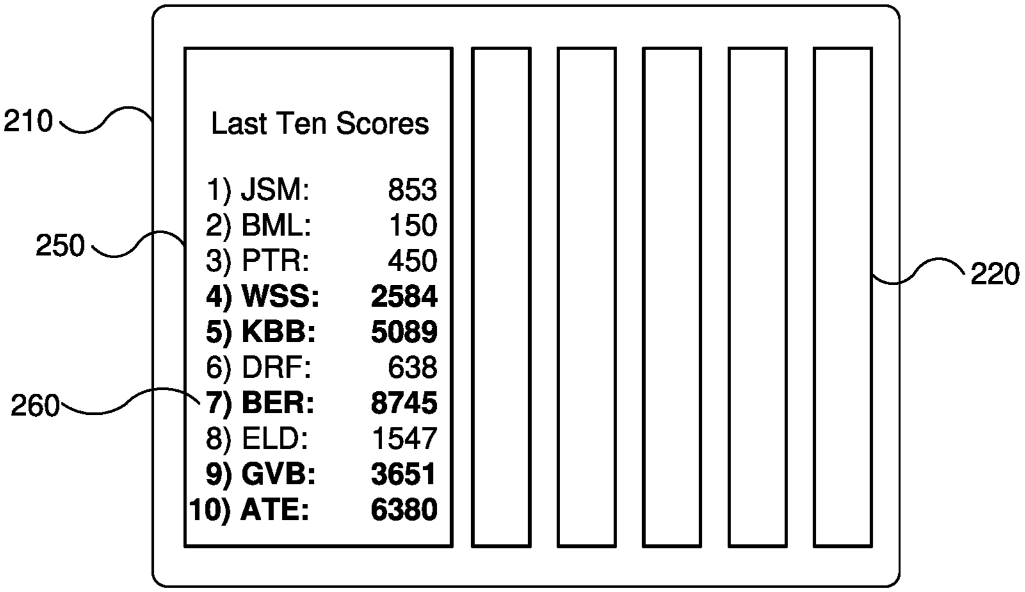

FIGS. 5A and 5B are detail diagrams of exemplary scoring displays on a gaming device according to embodiments of the invention. More specifically, FIGS. 5A and 5B illustrate embodiments of gaming devices displaying a recent score history. This display of recent scores may allow current players or other prospective players to see the relative results of previous scoring sessions, which may influence their decision on whether or not to continue play on a gaming device or start game play on the gaming device. For example, if a prospective player notices that the last few scores on a gaming device are particularly low, that player may feel that the gaming device is "due" for a "hot streak." In this example, other prospective players may interpret the recent low scores as an indication that the device is in a "cold streak" and avoid playing the device. The opposite reactions may also take place when the last few scores on a gaming device are particularly high.

FIGS. 5A and 5B illustrate exemplary ways of displaying recent scoring information to players in order to communicate how "hot" the gaming device has been recently according to embodiments of the invention. The "hotness" of a gaming device may be determined in various ways. In some embodiments, it may be a measure of how the player's actual payback percentage compares to an expected theoretical payback percentage of the gaming device. In other embodiments, it may be measured as the number of credits remaining after a scoring session versus the number of credits present at the start of a scoring session. Various other manners of determining this quality of the gaming device may be present in other embodiments, such as number of bonus sessions triggered, the number of free spins won, number of consecutive wins of a certain size, amount of player points accumulated, number of near misses, number of specific jackpot occurrences, number of winning gaming sessions received, etc. It is also possible to provide a score based upon the number of losses occurring within a session or the number of sequential losses, in order to provide a "bad beat" score in which a player with a particularly unlucky streak could still accomplish a distinctive score.

Referring to FIG. 5A, a gaming display 210 on a gaming device may include a game portion 220 and a recent score portion 230. Although the game portion 220 and the recent score portion 230 are shown simultaneously on the gaming display 210 in the embodiment shown in FIG. 5A, the recent score portion 230 may be shown on an attract screen separate from the game portion 220. In some embodiments the recent score portion 230 may only be displayed when players are not wagering on the gaming device (such as when the credit meter is at zero or a nominal amount for a predetermined amount of time) to provide prospective players with an indication of the recent scores achieved on the gaming device. In other embodiments, however, the recent score portion 230 may be displayed intermittently during game play or at the request of a player so that the player may keep track of his or her recent scoring sessions.

The recent score portion 230 may include a list of recent scores 240 that indicate how previous players fared during their gaming sessions. In the embodiment illustrated in FIG. 5A, the recent scores 240 include a player identifying mark (player initials in this example) and the percentage payback earned by that player. For example, player JSM was the last player to play the gaming device and earned a 108.62% payback. Since gaming devices typically provide a payback percentage of less than 100%, a prospective player may conclude that JSM did relatively well during his or her scoring session. In contrast, the prospective player may conclude that PTR, who had a payback percentage of 25.66%, did not have much luck during his or her scoring session. Although the embodiment shown in FIG. 5A shows different player identifying mark for each recent score 240, some players may play multiple scoring sessions on a gaming device and thus have their identifying mark and score listed several times in a row. For example, the top two recent score entries may both be for player JSM.

In other embodiments, the recent score portion 230 may only display a total or average score earned by each player during a total gaming session. That is, if a player plays the gaming device through two or more scoring sessions, only one recent score entry 240 on the score history portion 230 would be shown with a combined player score. In this embodiment, the payback percentage shown on the recent score entry 240 would be the player's combined or average payback percentage over both scoring sessions. Thus, if a player earned a 105% payback for a first scoring session and a 95% payback for a second scoring session, one recent score entry 240 may be generated to show the player identifying mark associated with a 100% payback score.

The embodiment shown in FIG. 5B may be similar in some ways to the embodiment shown in FIG. 5A except for the format of the recent score entries 260 in the recent score portion 250. Referring to FIG. 5B, recent score entries 260 may include a player identifying mark and a score value. The score value may be related to the payback percentage achieved by a player, but may also include other bonus score points not directly related to the payback percentage. For example, a player may score additional points by triggering a bonus, receiving five losing game outcomes in a row, achieving a certain coin-in amount during the scoring session, or other gaming events.

Since the score values themselves may not readily reveal how well a player did during a scoring session, relatively high scoring recent score entries 260 may be highlighted to distinguish them from other lower score entries. This highlighting may include bolding the higher scores, flashing the higher scores, putting the higher scores in a different color or font, etc. In some embodiments, scores that reflect a scoring session with a payback percentage over the theoretical payback percentage may be highlighted. In other embodiments, a gaming establishment may set a score amount over which a recent score entry 260 may be considered a relatively high score and be highlighted. When multiple games of a type are combined for determination of high score, a player that achieves a new high score could have that score, and optionally their identifier, appear on the displays of other like games informing other players that a new high score was just accomplished. In one embodiment, the high score display becomes an interactive leader board showing lead changes as they occur.

Figure 6A:
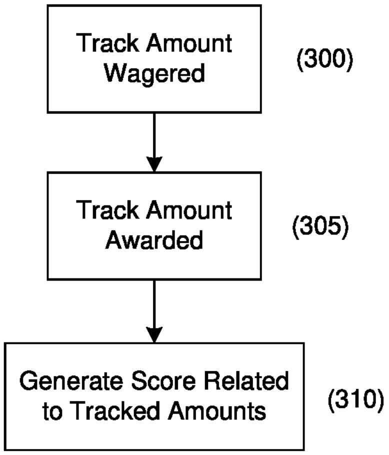
FIGS. 6A and 6B are flow diagrams of methods for generating a score related to game play on a gaming device according to embodiments of the invention.
Figure 6B:
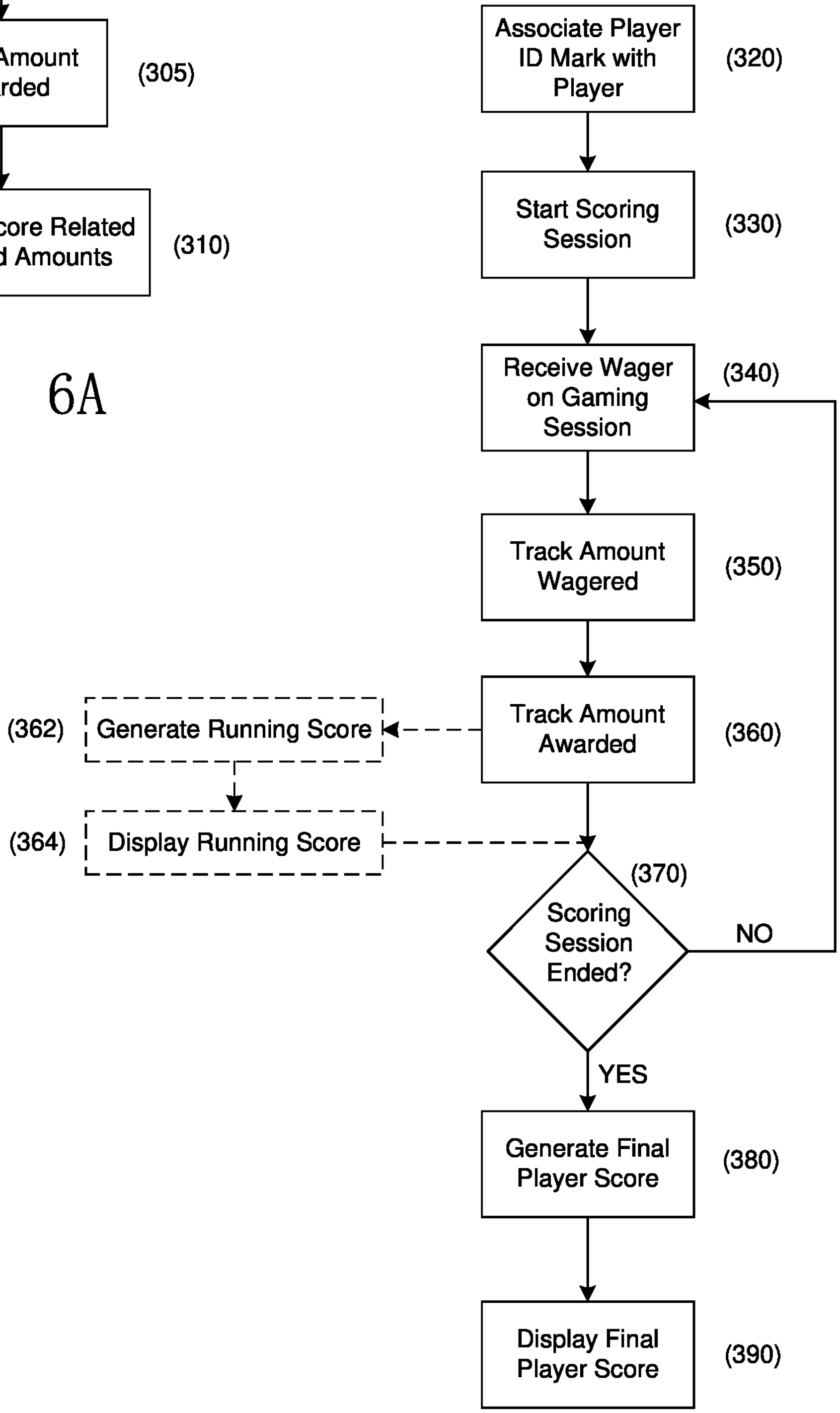

Turning back to the scoring system itself, embodiments of the present development implement a scoring system for player of gaming devices. Scores in this scoring system may be based on the total win for each player or may be based on who achieves the most of a particular award type. FIGS. 6A and 6B are flow diagrams of methods for generating a score related to game play on a gaming device according to embodiments of the invention.

Referring to FIG. 6A, a method for generating a score includes tracking an amount wagered 300, tracking an amount awarded 305, and generating a score related to these tracked amounts 310. The amounts wagered 300 and awarded 305 may be tracked over a predetermined number of games, over a predetermined amount of time, or over another similar predetermined measuring standard. This predetermined standard may make up a scoring session, over which the tracked amounts wagered 300 and tracked amounts awarded 305 are used in generating a final score. The final score may reflect the score achieved by the player over the scoring session. Since the scores are compared to other player scores, it is generally preferable to maintain consistent criteria in defining a scoring session within a gaming establishment. Further, since players play at different rates, and can be interrupted by friends, servers, or casino courtesy staff members, some embodiments use a particular number of games wagered on as a measuring guide for a scoring session. For example, a scoring session may be defined as a session that includes the wagers and results from 25 games played. That is, a final score may be generated and recorded for each 25 games played by a player. Shorter gaming durations may simply record a score based on the number of games played or may use an interpolation algorithm to generate a score predicted by the partial completion of the scoring session. Scoring sessions may also be reset when zero credits or a nominal amount of credits appear on the credit meter for a predetermined amount of time. A running score may also be calculated during the scoring session and displayed to the player in a current player score 160 on a player score portion 150 (FIG. 4).

To ensure fairness when comparing scores, generating a score related to the tracked amounts 310 may include normalizing the scores. One way to normalize the scoring would be to track winnings over a designated amount, e.g., $20. In this embodiment, a score may be expressed as a ratio in the form of:

(amount wagered−amount awarded)/(amount wagered).

This creates a percentage that could be compared to the house advantage, i.e., the hold for the machine in question. For example, if the machine hold is 9%, the above ratio should converge to 9% over time. If the above ratio for $20 wagered is less than 9%, the player is deemed to have beaten the house and will receive an appropriate score.

In other embodiments, the scores could be normalized based on credits wagered instead of designated monetary amount. This may further normalize scores on gaming devices that allow multiple denominations to be wagered. In these embodiments, the score may be recorded over a predetermined number of credits wagered. For example, the score may be based on the payback percentage for one thousand credits wagered. In this example the score could be expressed as a ratio in the form of:

(credits won)/(credits wagered)

In other embodiments, the normalization may be independent of the scoring session criteria. For example, the scoring session may be defined by a number of games (e.g., 25 games), but the final score may be normalized by the amount of credits wagered. A scoring example is provided below to illustrate how one of these embodiments may be implemented.

Scoring Example #1

In this example, three players (player A, player B, and player C) play a multi-line (20 line) video slot. A scoring session is defined in this example to be 500 games wagered on. Since this is a 20 line game, a player playing all 20 lines would be playing 20 games at once (one "game" for each line played). Also in this example, 5 points are awarded for each credit awarded and 100 bonus points (times the amount wagered per line (game)) are awarded for each bonus trigger. The scores are normalized by dividing the non-normalized score by the credits wagered and then multiplying that value times 1000 and rounding up if necessary. Using this example scoring system, players A, B, and C may have respective scoring sessions as set out in Table #1. Note that player A is playing a single credit per line and only betting on one line, player B is playing all 20 lines and wagering 20 credits per line, and player C is playing all 20 lines and wagering one credit on each line.

TABLE 1

| | Player A | Player B | Player C |
|---|---|---|---|
| Games Wagered On (Scoring Session) | 500 | 500 | 500 |
| Gaming Sessions | 500 | 25 | 25 |
| Total Credits Wagered | 500 | 10,000 | 500 |
| Total Credits Awarded | 550 | 10,100 | 400 |
| # of Bonus Triggers | 0 | 1 | 2 |
| Player Score (Not Normalized) | 2750 | 52,500 | 2200 |
| Player Score Normalized | 5,500 | 5,250 | 4,400 |
| Credits Actually Won/Loss | +50 | +100 | −100 |

As Table #1 shows, although player B takes home the most credits during the scoring session, player A actually receives a slightly higher score because of the normalization of the scores. A running score for each player may also be kept by dividing the current points won by the current credits wagered and multiplying by 1000. To keep a running score that does not fluctuate (i.e., usually increases), a running score may be calculated by dividing the current points won by the expected credits wagered (that is, the number of credits expected to be wagered at the end of the scoring session based on the credits per line/game currently being wagered).

In yet other embodiments, scores could be based only a particular portion of a game. For example, in video poker, scores may be based on the number of hands that result in a flush or better per a designated number of hands. In slot machines, scores may be based on the number of wild symbols that appear on the screen, the number of paylines that have a winning combination, or number of games with a winning combination. In addition, the scores may be related to a particular result of a bonus game associated with the gaming device. For example, in a secondary bonus game, high scores with associated player information may be displayed for high returns in the bonus game. Each of these examples may additionally be normalized.

Scores may also be given during rolling time frames or rolling wager frames. That is, a time frame or wager frame may be set where a score is reflected as the best segment in that predetermined frame. For example, a scoring session may be defined as the best score resulting from 10 minutes of wagering within an hour time frame window. Thus, in this example, a player may have a very high scoring 10 minutes from the $12^{th}$ minute of gaming to the $22^{nd}$ minute of gaming during an hour time frame. At the end of the hour time frame, the score from the $12^{th}$ to $22^{nd}$ minute may be reflected as the player's score.

Similarly, in another example, a score may be determined by the best scoring results achieved for $20.00 wagered in a $100.00 wager frame. Thus, in this example, if a player scores particularly well from the $70^{th}$ dollar wagered to the 90 dollar wagered during a $100.00 wager frame, that score may be reflected as the player score for the $100.00 time frame. In other embodiments, time and wagers may be intermixed in determining scoring sessions and predefined rolling frames, as illustrated below in Example #2.

Scoring Example #2

In this example, player scores are determined by outcome based events that occur during a scoring session on a spinning reel quarter slot machine having a single center payline. In this example, a score is awarded for the best $20.00 consecutively wagered during a 30 minute time period. That is, if the player wagers a total of $50.00 during a thirty minute time interval, the gaming device calculates the bet scoring stretch during that time interval in which $20.00 was wagered. Additionally, in this example, the score is based on symbols appearing on the payline. Table #2 below sets out the scoring for each symbol occurring on the payline for the three reel slot machine.

TABLE 2

| Symbol on Payline | Score | 3 Symbols on Payline | Score |
|---|---|---|---|
| Blank | 0 | Blank Blank Blank | 5 |
| Cherry | 2 | Cherry Cherry Cherry | 50 |
| Bar | 5 | Bar Bar Bar | 100 |
| Double Bar | 10 | DBar DBar DBar | 200 |
| Triple Bar | 15 | TBar TBar TBar | 500 |
| 7 | 20 | 7 7 7 | 2000 |
| Jackpot | 25 | Jackpot Jackpot Jackpot | 10,000 |

Thus, this example uses a rolling time frame in which a scoring session may exist. In addition, the scoring system utilized in this example may not directly reflect a players overall payback on the gaming device. That is, a player may receive numerous "Jackpot" or "7" symbols on the payline, which may generate a significant score without the player actually winning any credits back for gaming outcomes.

In other embodiments, scoring systems may be devised such that an initial goal value is given and players aim to get as close as possible to the target value. For example, 1000 credits may be defined as a target value for a scoring session based on time, amount wagered, or type of awards won. During the scoring session, a player may wager more or fewer credits to get as close as possible to finishing with 1000 credits. A bonus award may be given to players coming within a certain number of credits of the target value. Additionally, if a player earned far more credits than the target value, the disappointment with a low scoring game may be offset by the high return of money. On the other hand, a sub-par credit return that resulted in a high score a possibly a bonus award may result in a positive gaming experience for the player even though a large amount of credits were not awarded during the scoring session.

All players may enter their respective scores in a manner that permits others to view all of the entered scores, e.g., on a video screen or on a screen associated with one of the games. Alternatively, the players would be permitted to enter the information only if they were among the top achievers. Such information could include initials, names, photos, or other identification. Awards based on scoring could be offered at intervals, such as daily, weekly, and/or monthly. A side bet may be required to compete, thus providing a source of funds, such as a progressive pool, to pay awards based on scoring.

Light and sound could be used to inform the player and others in the casino how well a particular player or machine was performing. For example, lights could form a vertical tower that grows in proportion to the player's score.

Similarly, a particular machine could be lit depending upon its score. For example, if a video screen game is paying above house average, over 91% in the above example, its screen or other indicator turns red. The brighter the red color, the better the machine is playing. If the machine is playing below house average, it could be indicated using shades of blue. This serves as a signal to players who like to seek out games based on their past performance. Some like to choose a game that recently pays awards above the house average in the belief that the machine is "hot" and will continue to so pay. Others like to seek out machines that are paying below house average in the belief that such machines will soon change to paying more or higher jackpots.

Referring to FIG. 6B, another method of generating a score on a gaming device related to game play may include associating a player identification mark with a player 320. As discussed above, a player may be associated with an identification mark 320 when they input a player tracking card or when they input credits on to the gaming device. When using a player tracking card, a preferred player identification mark that may have been chosen by the player at an earlier time, is associated with the player. These identification marks may include names, pseudonyms, initials, pictures, avatars, etc. For unidentified players inserting credits on a gaming device, the gaming device may prompt a player to enter an identifying name or mark, and may ask the player if they would like to open a player tracking account.

A scoring session may then begin 330 on the gaming device, in which all amounts wagered and awarded are tracked. As discussed above, a scoring session may include various predetermined measurement criteria. During the scoring session, wagers are received from the player on a gaming session 340, where the amount wagered 350 and any amount awarded 360 are tracked. In some embodiments, a running score may be generated 362 to reflect the player's current score and this running score may also be displayed 364. It is then determined whether the scoring session has ended 370. If the scoring session has not ended, the player is allowed to wager again on another gaming session 340. On the other hand, if the scoring session has ended, a final score may be generated 380 and displayed 390.

In other embodiments, players may be divided into groups or categories and compete or view the scores only of others within the group or within a set of groups. In one example, a group of players with a common affiliation, wish to compete against one another. By identifying each as a member of a particular group in their player tracking server record, or by other means, a player within that group would only see scores of others from the same group. The group could make side bets wherein the winner takes a pooled prize, or the winner could be paid a progressive jackpot that is unique to that group.

It is also possible to combine players into teams. In this way a team of one affiliation could compete against a team of another affiliation to see which group has the aggregate high score. Scores could be normalized and aggregated across all machines within one or more casinos, or only on specific machines or specific areas within one or more casinos.

Scoring could be done based upon time of day, day of week or other temporal dividing technique. It is often common for players of a specific demographic to visit the casino at specific times or days. For example, retired people most often visit casinos during weekday afternoons when casinos are less crowded. A high score could be calculated for any player, or group of players to only count their play that occurs Monday through Friday between noon and 4 PM. In this way, high scores could simultaneously serve different constituencies.

The casino may also choose to provide a bonus to the player or team of players with the highest score within a specific time period, within a specific group, or any combination thereof.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out in the appended claims.

The invention claimed is:

1. A method comprising:

receiving, via a user interface of an electronic gaming device, a user identifier;

determining, based on a paytable stored in a memory of the electronic gaming device, a theoretical hold for the electronic gaming device;

receiving, via the user interface of the electronic gaming device, one or more inputs;

generating, by the electronic gaming device and based on the one or more inputs, one or more results;

determining, based on the one or more inputs to the electronic gaming device and the one or more results generated by the electronic gaming device, an actual hold associated with the electronic gaming device;

comparing, the actual hold to the theoretical hold;

determining, based on comparing the actual hold to the theoretical hold, one or more performance metrics associated with the user identifier;

receiving a plurality of prior performance metrics corresponding to one or more user identifiers associated with a plurality of separate electronic gaming devices;

comparing the one or more performance metrics to the plurality of prior performance metrics; and based on the comparison of the one or more performance metrics to the plurality of prior performance metrics, automatically rearranging a display of an electronic leader board associated with the electronic gaming device to include the one or more performance metrics on the electronic leader board.

2. The method of claim 1, further comprising defining a total number of consecutively wagered credits as a number of credits in response to at least one of (i) a user input prior to a score tracking session or (ii) an input from an operator.

3. The method of claim 1, further comprising resetting one or more performance metrics to an initial value after completion of a gaming event and during a current score tracking session in response to at least one of (i) a user input or (ii) determining that a number of credits is wagered that defines a total number of consecutively wagered credits.

4. The method of claim 1, further comprising modifying light emitted by the display of the electronic leader board associated with the electronic gaming device as a function of the one or more performance metrics.

5. The method of claim 1, wherein displaying the one or more performance metrics further comprises displaying the user identifier on the electronic leader board.

6. The method of claim 1, further comprising periodically updating the one or more performance metrics and associated user identifier on the electronic leader board.

7. The method of claim 1, wherein the one or more performance metrics are displayed in response to actuation of an actuator on the electronic gaming device.

8. The method of claim 1, wherein the electronic gaming device comprises one or more of: an electro-mechanical spinning-reel type slot machine, a video slot machine, or a video poker machine.

9. The method of claim 1, wherein the one or more performance metrics are associated with user identifiers comprising one or more of: initials, names, photos, or other identification.

10. The method of claim 1, wherein the actual hold and the theoretical hold each comprise a percentage.

11. The method of claim 1, further comprising outputting an award associated with the one or more performance metrics.

12. A method comprising:

receiving, via a user interface of a first electronic gaming device of a plurality of electronic gaming devices, one or more inputs associated with a user identifier, wherein each gaming device of the plurality of electronic gaming devices is a type of electronic gaming device;

generating, by the first electronic gaming device and based on the one or more inputs, one or more results;

determining, based on the one or more inputs to the first electronic gaming device and the one or more results generated by the first electronic gaming device, an actual hold associated with the first electronic gaming device;

comparing the actual hold associated with the first electronic gaming device to a theoretical hold associated with the type of electronic gaming device;

determining, based on the comparison of the actual hold associated with the first electronic gaming device to the theoretical hold associated with the type of electronic gaming device, a performance metric associated with the first electronic gaming device;

receiving a plurality of prior performance metrics corresponding to the plurality of electronic gaming devices;

comparing the performance metric associated with the first electronic gaming device to the plurality of prior performance metrics associated with the plurality of electronic gaming devices; and based on the comparison of the performance metric to the plurality of prior performance metrics, automatically rearranging a display on an electronic leader board of a second electronic gaming device of the plurality of electronic gaming devices to include the performance metric associated with the first electronic gaming device.

13. The method of claim 12, further comprising defining a total consecutively wagered amount as a number of credits in response to at least one of: (i) a user input prior to a score tracking session or (ii) an input from an operator.

14. The method of claim 12, further comprising resetting one or more performance metrics to an initial value after completion of a gaming event and during a current score tracking session in response to at least one of: (i) a user input or (ii) determining that a number of credits is wagered that defines a total consecutively wagered amount.

15. The method of claim 12, further comprising modifying light emitted by at least one display associated with the first electronic gaming device as a function of the performance metric associated with the first electronic gaming device.

16. The method of claim 12, further comprising periodically displaying at least one of:

the performance metric associated with a user of the first electronic gaming device; or the performance metric and an associated user identifier for each of a last defined number of users of the first electronic gaming device.

17. The method of claim 12, further comprising displaying the performance metric on at least one display and one or more performance metrics and an associated user identifier for each of a last defined number of users of the first electronic gaming device in response to actuation of an actuator of the first electronic gaming device.

18. The method of claim 12, wherein the plurality of electronic gaming devices comprise one or more of: one or more electro-mechanical spinning-reel type slot machines, one or more video slot machines, or one or more video poker machines.

19. The method of claim 12, wherein the performance metric is associated with one or more user identifiers, and wherein the one or more user identifiers comprise one or more of: initials, names, photos, or other identification.

20. The method of claim 12, wherein the actual hold and the theoretical hold each comprise a percentage.

* * * * *